US010599138B2

(12) United States Patent
Bosworth

(10) Patent No.: US 10,599,138 B2
(45) Date of Patent: Mar. 24, 2020

(54) AUTONOMOUS PACKAGE DELIVERY SYSTEM

(71) Applicant: Aurora Flight Sciences Corporation, Manassas, VA (US)

(72) Inventor: William Bosworth, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 89 days.

(21) Appl. No.: 15/699,276

(22) Filed: Sep. 8, 2017

(65) Prior Publication Data

US 2019/0079509 A1   Mar. 14, 2019

(51) Int. Cl.
| | |
|---|---|
| *G05D 1/00* | (2006.01) |
| *G05D 1/02* | (2020.01) |
| *G06Q 10/08* | (2012.01) |
| *G06Q 50/28* | (2012.01) |
| *B64D 1/08* | (2006.01) |
| *B64C 39/02* | (2006.01) |

(52) U.S. Cl.
CPC ............ *G05D 1/0016* (2013.01); *B64D 1/08* (2013.01); *G05D 1/0033* (2013.01); *G05D 1/0038* (2013.01); *G05D 1/0044* (2013.01); *G05D 1/0094* (2013.01); *G05D 1/0276* (2013.01); *G06Q 10/083* (2013.01); *G06Q 10/0832* (2013.01); *G06Q 10/08355* (2013.01); *G06Q 50/28* (2013.01); *B64C 39/024* (2013.01); *B64C 2201/128* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 5,920,276 | A | 7/1999 | Frederick |
| 6,927,694 | B1 | 8/2005 | Smith et al. |
| 6,948,681 | B2 | 9/2005 | Stupakis |

(Continued)

FOREIGN PATENT DOCUMENTS

| | | |
|---|---|---|
| DE | 102014211852 A1 | 12/2015 |
| EP | 2916309 A1 | 9/2015 |

(Continued)

OTHER PUBLICATIONS

Extended European search report for Application No. 18195738.2, dated Feb. 13, 2019.

(Continued)

*Primary Examiner* — Truc M Do
(74) *Attorney, Agent, or Firm* — Michael Stanley Tomsa; McAndrews, Held & Malloy, Ltd.; Eugene H. Nahm

(57) ABSTRACT

The present disclosure is directed to systems and methods for enabling unmanned and optionally-manned cargo delivery to personnel on the ground. For example, an aircraft may be used to provide rapid response cargo delivery to widely separated small units in demanding and unpredictable conditions that pose unacceptable risks to both ground resupply personnel and aircrew. Together with a ground vehicle, packages from the aircraft may be deployed to ground personnel in disbursed operating locations without exposing the ground personnel to the aircraft's open landing zone.

24 Claims, 19 Drawing Sheets

(56) References Cited

U.S. PATENT DOCUMENTS

| | | | |
|---|---|---|---|
| 8,108,092 B2* | 1/2012 | Phillips | G05D 1/0033 701/23 |
| 8,260,736 B1 | 9/2012 | Lear et al. | |
| 8,265,818 B2 | 9/2012 | Allport | |
| 8,316,555 B2* | 11/2012 | Goossen | F16M 11/126 33/561 |
| 8,384,534 B2 | 2/2013 | James et al. | |
| 8,437,890 B2 | 5/2013 | Anderson et al. | |
| 9,296,401 B1 | 3/2016 | Palmer et al. | |
| 9,557,742 B2 | 1/2017 | Paduano et al. | |
| 9,573,684 B2* | 2/2017 | Kimchi | B64C 39/024 |
| 9,817,396 B1* | 11/2017 | Takayama | G05D 1/0038 |
| 9,841,761 B2* | 12/2017 | Shehata | H04N 7/181 |
| 9,849,981 B1* | 12/2017 | Burgess | B64D 1/12 |
| 9,919,712 B1 | 3/2018 | Doyen et al. | |
| 9,958,875 B2 | 5/2018 | Paduano et al. | |
| 9,975,651 B1* | 5/2018 | Eck | B64F 1/32 |
| 10,139,822 B2* | 11/2018 | Yang | G05D 1/0088 |
| 2001/0026316 A1 | 10/2001 | Senatore | |
| 2003/0093187 A1 | 5/2003 | Walker | |
| 2008/0125920 A1 | 5/2008 | Miles et al. | |
| 2008/0158256 A1* | 7/2008 | Russell | G06T 7/32 345/629 |
| 2009/0050750 A1 | 2/2009 | Garrec et al. | |
| 2009/0055038 A1 | 2/2009 | Garrec et al. | |
| 2010/0017046 A1* | 1/2010 | Cheung | G01S 7/003 701/2 |
| 2010/0152933 A1 | 6/2010 | Smoot et al. | |
| 2011/0017863 A1* | 1/2011 | Goossen | F41G 7/303 244/3.14 |
| 2011/0068224 A1* | 3/2011 | Kang | B64C 39/024 244/116 |
| 2011/0139928 A1 | 6/2011 | Morris et al. | |
| 2011/0174931 A1 | 7/2011 | Berland | |
| 2011/0245996 A1 | 10/2011 | Orsulak et al. | |
| 2012/0065881 A1 | 3/2012 | McIver et al. | |
| 2012/0075119 A1 | 3/2012 | Dorneich et al. | |
| 2012/0091259 A1 | 4/2012 | Morris et al. | |
| 2012/0233447 A1 | 9/2012 | Fitzgerald | |
| 2012/0319869 A1 | 12/2012 | Dorfmann et al. | |
| 2013/0008998 A1 | 1/2013 | Morris et al. | |
| 2013/0054054 A1 | 2/2013 | Tollenaere et al. | |
| 2013/0116856 A1 | 5/2013 | Schadeck | |
| 2013/0200207 A1 | 8/2013 | Pongratz et al. | |
| 2013/0233964 A1* | 9/2013 | Woodworth | B64C 37/02 244/2 |
| 2014/0124621 A1 | 5/2014 | Godzdanker et al. | |
| 2014/0180914 A1 | 6/2014 | Abhyanker | |
| 2014/0240132 A1 | 8/2014 | Bychkov | |
| 2014/0276090 A1 | 9/2014 | Breed | |
| 2014/0316616 A1 | 10/2014 | Kugelmass | |
| 2015/0012186 A1 | 1/2015 | Horseman | |
| 2015/0148988 A1* | 5/2015 | Fleck | G05D 1/0011 701/2 |
| 2015/0323932 A1* | 11/2015 | Paduano | G05D 1/042 701/3 |
| 2015/0346722 A1* | 12/2015 | Herz | G05D 1/0038 701/2 |
| 2016/0090097 A1 | 3/2016 | Grube et al. | |
| 2017/0029103 A1 | 2/2017 | Chang et al. | |
| 2017/0073071 A1* | 3/2017 | Salzmann | B64D 1/22 |
| 2017/0090480 A1 | 3/2017 | Ho et al. | |
| 2017/0277185 A1 | 9/2017 | Duda et al. | |
| 2017/0334561 A1* | 11/2017 | Sopper | B64D 1/22 |

FOREIGN PATENT DOCUMENTS

| | | |
|---|---|---|
| EP | 2933788 A2 | 10/2015 |
| GB | 2543503 A | 4/2017 |
| WO | 2015/200224 A2 | 12/2015 |
| WO | 2016/118672 A2 | 7/2016 |
| WO | 2016/164416 A1 | 10/2016 |

OTHER PUBLICATIONS

Extended European search report for Application No. 18195747.3, dated Feb. 25, 2019.

M. Whalley et al., "The NASA/Army Autonomous Rotorcraft Project," American Helicopter Society 59th Annual Forum, May 6-8, 2003.

Gould, Joe, "Precision Airdrop System Land at CENTCOM on Time," Defense News, Dec. 19, 2014.

Kiesielowski, E. et al., "Technical Report No. LWL-CR-09M71, Rough Terrain Ground Handling System for Helicopters," Final Report, U.S. Army Land Warfare Laboratory, Apr. 1974.

K-MAX Unmanned Aircraft System brochure, Copyright 2010 Lockheed Martin Corporation.

Dollar, Aaron "Aerial Grasping and Manipulation," the GRAB Lab, Yale University, 2012.

Morton, Kye et al., "Development of a Robust Framework for an Outdoor Mobile Manipulatio UAV," 978-1-4673-7676-1/16/$31.00 © 2016 IEEE.

Nuss, Andrew "Aerial Reconfigurable Embedded System (ARES)," Defense Advanced Research Projects Agency, Program Information, https://www.darpa.mil/program/aerial-reconfigurable-embedded-system.

Extended European search report for Application No. 18192059.6, dated Feb. 4, 2019.

Extended European search report for Application No. 18194074.3, dated Feb. 11, 2019.

Akerstedt, T. & Gillberg, M.; Subjective and Objective Sleepiness in the Active Individual., Intern. J. Neurosci., 1990, 52: pp. 29-37.

Bergasa, L. M., Nuevo, J., Sotelo, M. A., Barea, R., & Lopez, M. E.; Real-Time system for Monitoring Driver Vigilance, IEEE Transactions on Intelligent Transportation Systems, vol. 77, No. 1, Mar. 2006, 63-77.

Oman, C. M., & Liu, A. M. (2007). Locomotive In-Cab Alerter Technology Assessment, Excerpted from: Development of Alternative Locomotive In-Cab Alerter Technology: Final Technical Report DOT Volpe PR#79-3389, DTS-79, Volpe National Transportation Systems Center, Cambridge, MA, Nov. 30, 2006.

Ji, Q., Lan, P., & Looney, C.; A Probabilistic Framework for Modeling and Real-Time Monitoring Human Fatigue. IEEE Transactions on Systems, Man, and Cybernetics—Part A: Systems and Humans, 2006, 36(5), 862-875.

Riener, A., & Ferscha, A.; Reconfiguration of Vibro-tactile Feedback based on Drivers' Sitting Attitude. 2009 Second International Conferences on Advances in Computer-Human Interactions (pp. 234-242). IEEE.

Heikenfeld, Jason, "Sweat Sensors Will Change How Wearables Track Your Health," IEEE Spectrum, Oct. 22, 2014.

Peláez, G.A., Garcia, F., Escalera, A., & Armingol, J. M.; Driver Monitoring Based on Low-Cost 3-D Sensors, IEEE Transactions on Intelligent Transportation Systems, 2014, 15(4), pp. 11687-11708.

Abd-Elfattah, H. M., Abdelazeim, F. H., & Elshennawy, S.; Physical and cognitive consequences of fatigue: A review. Journal of Advanced Research (2015) 6, 351-358.

Solomon, C., & Wang, Z.; Driver Attention and Behavior Detection with Kinect. J. Image Graph, 3(2), Dec. 2015, 84-89.

Pilot incapacitation occurrences 2010-2014, Australian Transport Safety Bureau, Report No. AR-2015-096, published Feb. 18, 2016.

wikipedia, "Electronic Nose".

https://www.indiegogo.com/projects/driver-assistance-system-for-train-conductors#/.

chamberlain, L. et al., "Self-Aware Helicopters: Full-Scale Automated Landing and Obstacle Avoidance in Unmapped Environments," American Helicopter Society 67th Annual Forum Proceedings, Virginia Beach, Virginia, May 2011.

Office of Naval Research, Broad Agency Announcement No. 12-004.

Whalley, M. et al., "Field-Testing of a Helicopter UAV Obstacle Field Navigation and Landing System," American Helicopter Society 65th Annual Forum Proceedings, Ft. Worth, Texas, May 2009.

J. Paduano et al., "TALOS: An Unmanned Cargo Delivery System for Rotorcraft Landing to Unprepared Sites," American Helicopter Society 71st Annual Forum Proceedings, Virginia Beach, Virginia, May 2011.

(56) References Cited

OTHER PUBLICATIONS

"Autonomous Aerial Cargo/Utility System (AACUS): Concept of Operations (CONOPs)," The Office of Naval Research, Dec. 22, 2011.
R. Brockers et al., "Autonomous landing and ingress of micro-air-vehicles in urban environments based on monocular vision".
M. Verbandt et al., "Robust marker-tracking system for vision-based autonomous landing of VTOL UAVs," IMAV 2014.
S. Lange et al., "A Vision Based Onboard Approach for Landing and Position Control of an Autonomous Multirotor UAV in GPS-Denied Environments".
J. Paduano et al., "TALOS: An unmanned cargo delivery system for rotorcraft landing to unprepared sites," Jan. 2015.
IPR Petition PTAB-IPR2018-01704—date Sep. 11, 2018.
Examination report for Application No. 18192059.6, dated Oct. 15, 2019.

\* cited by examiner

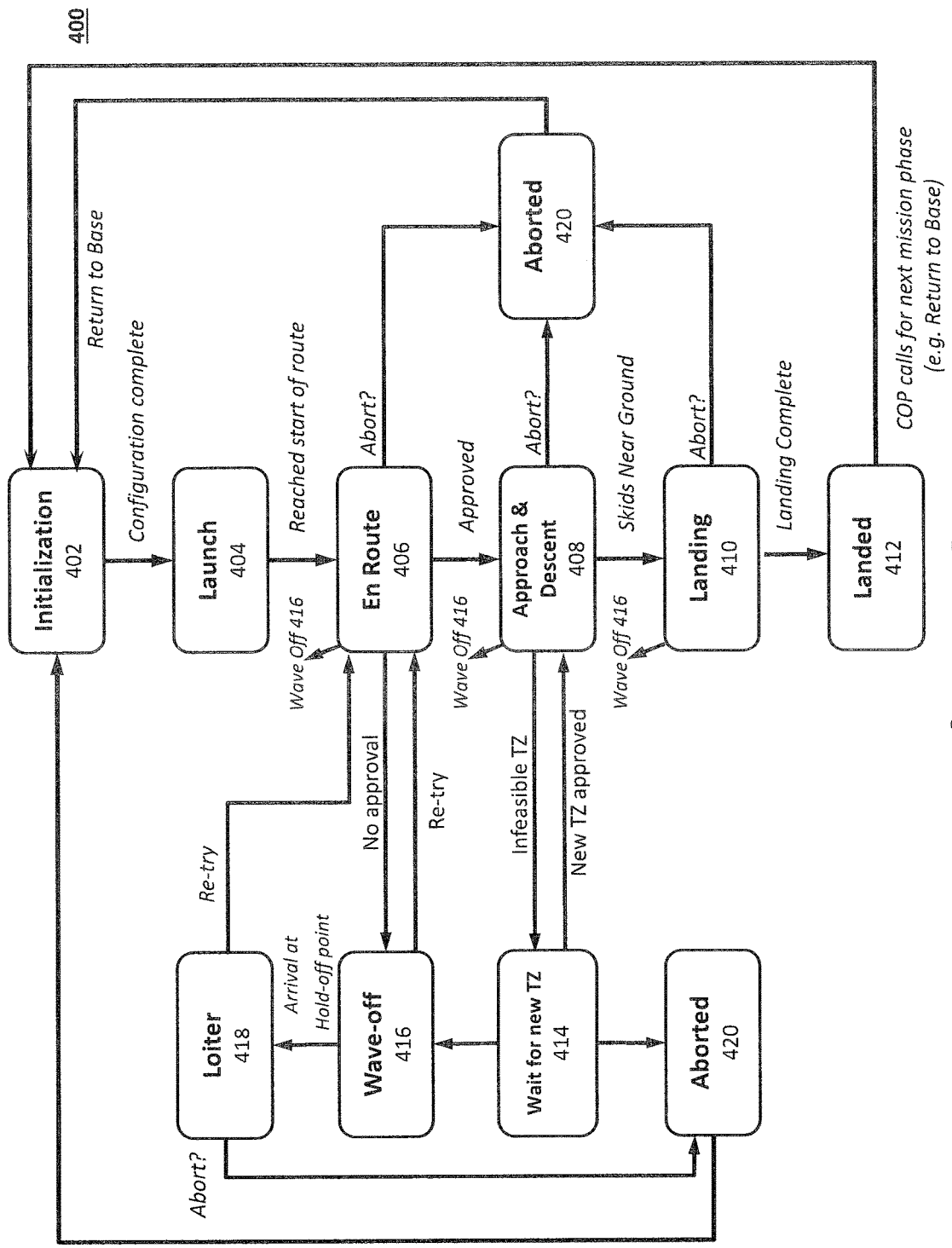

AUTONOMOUS PACKAGE DELIVERY SYSTEM

TECHNICAL FIELD

The present disclosure is directed to systems and methods for enabling unmanned and optionally-manned cargo delivery.

BACKGROUND

Resupply and casualty evacuation (CASEVAC) under hazardous field conditions often results in casualties, in terms of those both on the ground and in the air. Establishing an infrastructure to facilitate CASEVAC, however, is generally impractical in the field. Therefore, a number of developments have been pursued to facilitate package delivery in such austere conditions, which are common to a variety of mission sets, such as humanitarian relief operations, noncombatant evacuations, routine cargo resupply, underway replenishment, irregular warfare, and sustained conventional combat.

One method of package delivery is a precision airdrop, which involves dropping a package from an aircraft to the ground. The Joint Precision Airdrop (JPAD) system, for example, endeavors to deliver a package to a designated waypoint. The JPAD system, however, must first be programmed before it is loaded onto the aircraft, and once it is deployed, it uses GPS data to form a glide path to the waypoint. The JPAD system can take airspeed data and adjust itself in flight and terrain data to avoid obstacles that would otherwise cause the drop to crash or miss its waypoint. Another method is to use an unmanned aerial vehicle (UAV) to deliver the package to the waypoint. Each of these methods, however, requires an unobstructed flight path to the waypoint, which typically requires that the waypoint be in an open area free of obstructions (e.g., trees, mountains, etc.). Such open areas, however, expose personnel on the ground to unwanted attention and harm when gathering the package from the aircraft. Therefore, delivery to a covered location provides enhanced safety to the ground personnel.

In lieu of aircraft, Unmanned Ground Vehicles (UGV) may be used to port the package to a destination. In practice, these UGVs can be navigated, using a remote control, to a covered location from the covered location by a human. UGVs, however, are limited in that a ground path must be available for the UGV to navigate to a waypoint. For example, obstacles (e.g., streams, ravines, buildings, etc.) can prohibit access of the UGV to the waypoint. Accordingly, while UGVs are more agile on the ground, UGVs are not well-suited for long distance travel to a waypoint, which is a benefit an aircraft. Moreover, UGVs suffer from a limited view beyond its immediate surroundings, which introduces additional navigational challenges. Therefore, a need exists for systems and methods for enabling unmanned and optionally-manned cargo delivery to personnel on the ground.

BRIEF SUMMARY OF THE INVENTION

The present disclosure provides systems and methods for enabling unmanned and optionally-manned cargo delivery to ground personnel.

According to a first aspect, a package delivery system for use with an aircraft comprises: a land vehicle equipped with a first processor operatively coupled with a first sensor package and a first communication transceiver, the first processor configured to navigate the land vehicle along a navigational land route based at least in part on data received via the first communication transceiver; a perception system having a second sensor package operatively coupled with a second processor and a second communication transceiver; and a human-system interface (HSI) device to communicate with the land vehicle and the perception system over one or more wireless links, wherein the HSI device, which is separate and apart from each of the land vehicle and the perception system, includes a third processor, a third communication transceiver, a user input device, and a display device, wherein the perception system is configured to transmit navigational commands to said land vehicle via said first communication transceiver based at least in part on data from the second sensor package, and wherein the HSI device is configured to transmit navigational commands to said land vehicle via said third communication transceiver and to receive from the land vehicle a video feed captured by the first sensor package.

In certain aspects, the second sensor package includes a first optical payload and a second optical payload, each of said first optical payload and said second optical payload to be positioned at different locations of the aircraft.

In certain aspects, said first optical payload is configured to generate terrain data for a geographic area prior to landing at a touchdown zone within the geographic area, wherein the second processor is configured to determine the navigational land route from the touchdown zone to a field operator based at least in part on the terrain data.

In certain aspects, said second optical payload is configured to track the land vehicle from the touchdown zone as the land vehicle travels along the navigational land route.

In certain aspects, each of said first optical payload and said second optical payload include LIDAR or a stereo vision camera system.

In certain aspects, the second processor is configured to determine a plurality of navigational land routes from the touchdown zone to the field operator based at least in part on the terrain data.

In certain aspects, the HSI device is configured to present to the field operator, via the display device, the plurality of navigational land routes for selection by the field operator through the user input device.

In certain aspects, the perception system is configured to, in real time, (1) detect obstacles along the navigational land route, and (2) transmit navigational commands dynamically to autonomously navigate the land vehicle while it travels along the navigational land route.

In certain aspects, the HSI device is configured to display the video feed on the display device.

In certain aspects, the HSI device is configured to receive from the perception system a second video feed captured by the second sensor package and the HSI device is configured to display the second video feed on the display device.

In certain aspects, navigational commands from the HSI device are prioritized over navigational commands from the perception system.

In certain aspects, said user input device is a touch screen and the HSI device is configured to display a remote controller screen via the display device.

In certain aspects, the HSI device is configured to display a land vehicle route screen via the display device.

In certain aspects, said user input device is a touch screen and the HSI device is configured to simultaneously display the video feed and one or more navigational controller icons via the display device.

In certain aspects, the aircraft is a vertical take-off and landing aircraft.

In certain aspects, the aircraft is configured to transport the land vehicle from a remote location to the touchdown zone.

In certain aspects, the aircraft in an unmanned aerial vehicle.

In certain aspects, the land vehicle in an unmanned ground vehicle.

According to a second aspect, an aircraft for transporting a land vehicle in a package delivery system comprises: a communication transceiver; a cargo bay to house the land vehicle; a sensor package having a first optical payload and a second optical payload, wherein said first optical payload is configured to generate terrain data for a geographic area prior to landing at a touchdown zone within the geographic area and said second optical payload is configured to track the land vehicle from the touchdown zone; and a processor operatively coupled with the sensor package and the communication transceiver, wherein the processor is configured to (1) identify the touchdown zone within the geographic area, (2) autonomously navigate the aircraft to the touchdown zone, (3) determine a navigational land route for the land vehicle from the touchdown zone to a field operator based at least in part on the terrain data, and (4) transmit navigational commands to said land vehicle via said communication transceiver based at least in part on data from the second optical payload.

In certain aspects, said second optical payload is configured to observe the land vehicle from the touchdown zone as the land vehicle travels along the navigational land route.

In certain aspects, each of said first optical payload and said second optical payload include LIDAR or a stereo vision camera system.

In certain aspects, the processor is configured to determine a plurality of navigational land routes from the touchdown zone to the field operator based at least in part on the terrain data.

In certain aspects, the second optical payload is configured to, in real time, (1) detect obstacles along the navigational land route, and (2) transmit navigational commands dynamically to autonomously navigate the land vehicle while it travels along the navigational land route.

In certain aspects, the aircraft in an unmanned aerial vehicle.

In certain aspects, the land vehicle in an unmanned ground vehicle.

In certain aspects, the aircraft is a vertical take-off and landing aircraft.

According to a third aspect, a human-system interface (HSI) device to facilitate bidirectional communication with a land vehicle and a perception system mounted to an aircraft at a touchdown zone that is configured to track the land vehicle as it travels along a navigational land route between the touchdown zone and a field operator comprises: a processor; a display device; a user input device operatively coupled with the processor; and a communication transceiver operatively coupled with the processor to communicate with the land vehicle and the perception system over one or more wireless links, wherein the HSI device, which is separate and apart from each of the land vehicle and the aircraft, is configured to (1) transmit navigational commands to said land vehicle via said communication transceiver, (2) receive from the land vehicle a video feed captured by a first sensor package positioned on said land vehicle via said communication transceiver, and (3) receive from the perception system location data reflecting the land vehicle's position along the navigational land route, wherein the location data is generated by a second sensor package of the perception system that is positioned on the aircraft.

In certain aspects, the display device is configured to display a plurality of navigational land routes for selection by the field operator through the user input device.

In certain aspects, the display device is configured to display the video feed.

In certain aspects, the HSI device is configured to receive from the perception system a second video feed captured by the second sensor package.

In certain aspects, the display device is configured to display the second video feed.

In certain aspects, said user input device is a touch screen and the display device is configured to display a remote controller screen.

In certain aspects, the display device is configured to display a land vehicle route screen.

In certain aspects, said user input device is a touch screen and the display device is configured to simultaneously display the video feed and one or more navigational controller icons.

According to a fourth aspect, an unmanned ground vehicle (UGV) for use in an aerial package delivery system comprises: a chassis to support a package; an optical payload to generate a video feed of a geographic area; a communication transceiver to facilitate bidirectional communication with a human-system interface (HSI) device and a perception system over one or more wireless links, wherein the perception system is coupled to an aircraft at a touchdown zone within the geographic area; and a processor operatively coupled with each of the communication transceiver and the sensor package, wherein the processor is configured to navigate the land vehicle along a navigational land route from the touchdown zone to a field operator based on navigational commands received from the HSI device or the aircraft via the communication transceiver, and to transmit the video feed to the HSI device.

In certain aspects, the navigational land route is received from the perception system via the communication transceiver.

In certain aspects, the perception system is configured to track the land vehicle from the touchdown zone as the land vehicle travels along the navigational land route.

In certain aspects, the communication transceiver is configured to receive navigational commands from the aircraft and the HSI device in real-time to autonomously navigate the land vehicle along the navigational land route.

In certain aspects, the processor is configured to localize the UGV based on its location relative to the aircraft.

BRIEF DESCRIPTION OF THE FIGURES

These and other advantages of the present disclosure will be readily understood with reference to the following specifications and attached drawings, wherein:

FIG. 4 illustrates an example flow diagram of an example mission for the aircraft of FIG. 1.

DETAILED DESCRIPTION OF THE INVENTION

Figure 1:
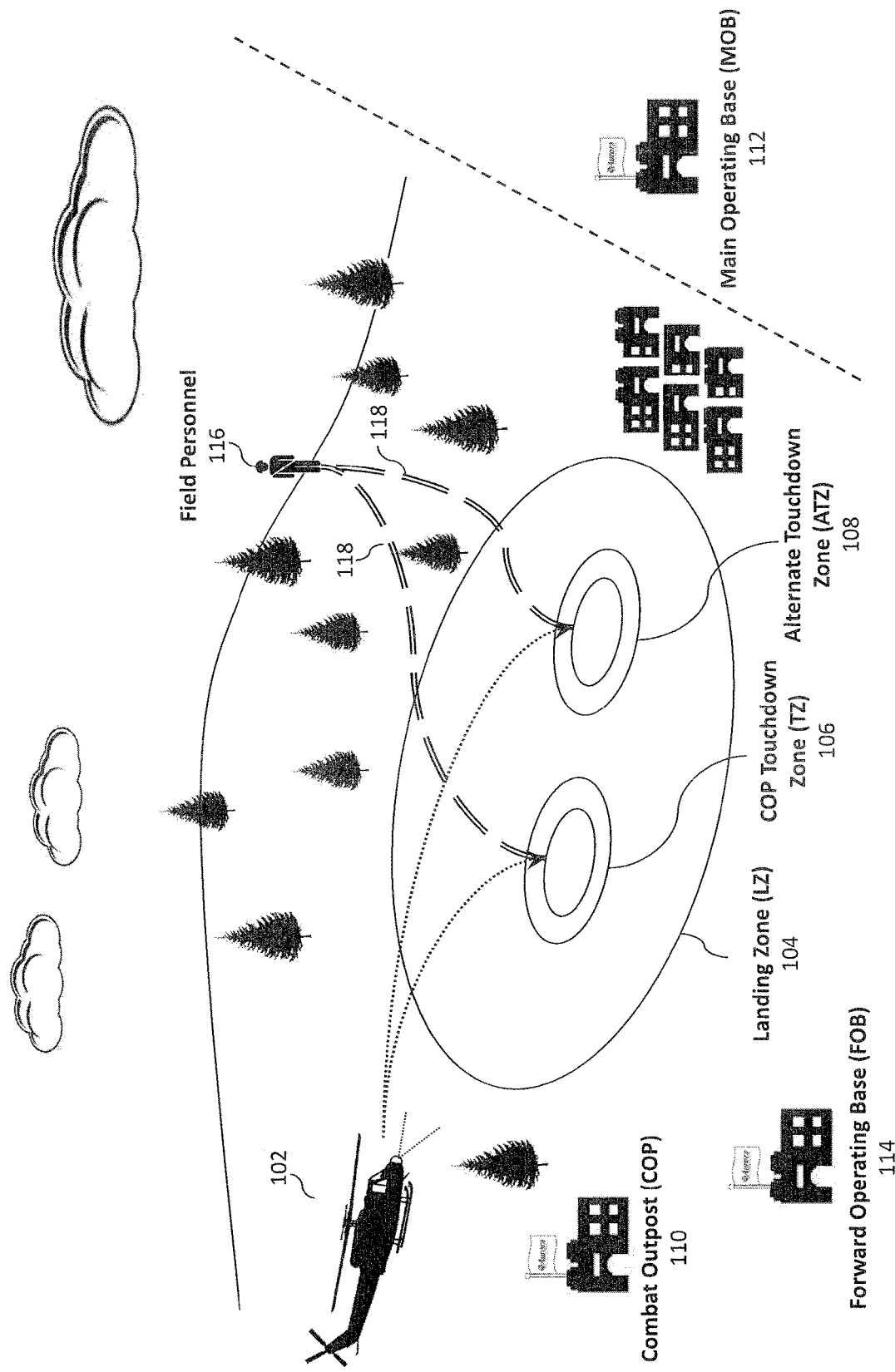
FIG. 1 illustrates an example aircraft equipped with an autonomous aerial cargo/utility (AACU) system on approach to a landing zone.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this disclosure, the following terms and definitions shall apply:

The terms "aerial vehicle" and "aircraft" refer to a machine capable of flight, including, but not limited to, fixed wing aircraft, rotorcraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments," or "invention" do not require that all embodiments of the invention include the discussed feature, advantage or mode of operation.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

As disclosed herein, an aircraft (e.g., an unmanned, optionally-manned, or manned) may be employed in connection with a package delivery system to provide rapid response cargo delivery to widely separated small units in demanding and unpredictable conditions that pose unacceptable risks to both ground resupply personnel and aircrew. Using a UGV, packages from the aircraft may be deployed to ground personnel in disbursed operating locations. For example, an aircraft may fly to the ground personnel's location (e.g., whether piloted, with minimal human assistance, and/or autonomously) land in an austere, possibly contested landing zone, where the UGV facilitates the final ground transfer step of the package delivery to a field operator without exposing the ground personnel to the aircraft's open landing zone (LZ). The package delivery system is widely applicable for autonomous cargo capability across different vehicle platforms, thereby facilitating sufficient reliability to be entrusted with not just precision cargo delivery, but also with evacuating human casualties from remote sites. As will be discussed, the package delivery system may be implemented via a human-system interface (HSI) device and one or more computational resource and sensor suites mounted on vehicle platforms (e.g., the aircraft and/or the UGV), together with software that facilitates the planning, sensing, and avoidance functions.

The package delivery system may be provided via a modular open architecture software and sensor suite including supervisory control interfaces that can be rapidly and cost-effectively integrated and physically mounted on a number of different aircraft platforms. As proprietary systems can hinder or prevent cost-effective upgrades and modifications, an open architecture, such as a Global Open Architecture Layer (GOAL), may be employed to allow portability (e.g., the software that allows a new or legacy platform the ability to "plug in" to the software and sensor suite will be open source). Thus, a package delivery system's software, sensor packages (e.g., a sensor payload/sensor suite, which may further include a processor, and/or other supporting hardware), and supervisory control interfaces may be portable across different vehicles such that both legacy and new platforms can exploit the benefits of the package delivery system. Further, the concept of modularity can also apply to components within systems or vehicles to enhance cross-system compatibility while simplifying field level maintenance and repair.

Another objective of the package delivery system is threat and/or obstacle detection and avoidance, autonomous landing site selection, and descent-to-land capabilities that incorporate autonomous mission planning technologies in an open architecture framework that interfaces seamlessly with the aircraft, the unmanned aerial system (UAS) network, control infrastructures, UGV, and other systems.

The package delivery system, which functions as a form of supervisory control system of the aircraft and the UGV, may generally comprise, inter alia: (1) a sensor package to accomplish detection of obstacles and perception of physical features and their properties, including perception of the UGV among the physical features; (2) a mission management layer that enables optional human supervisory control through advanced autonomy; (3) route and trajectory planner for generating aircraft and UGV navigational commands; and (4) a mission-centered global open architecture layer. Employing an open architecture and/or GOAL further allows portability of the package delivery system capability to other platforms. Alternatively, portions of the package delivery system (e.g., its sensor package and supervisory control system) may be integrated with the aircraft platform during aircraft fabrication. The package delivery system may further comprise one or more human-system interface (HSI) devices to communicate data/commands between the package delivery system and a combat outpost (COP), a remote main operating base (MOB), and/or a forward operating base (FOB). During the approach phase, the package delivery system may perceive physical features of the ground (e.g., a landing zone) to identify and land the aircraft at a predetermined touchdown zone (or alternative touchdown zone, as it may be), in which case generating terrain data. The generated terrain data may be used to generate a navigational land route for the UGV between the touchdown zone and the ground personnel.

The package delivery system's sensor package and supervisory control system may be integrated and/or physically mounted on a number of different vehicle and aircraft platforms, including VTOL platforms. While the aircraft depicted in the Figures is a VTOL aircraft, it will be understood that the autonomous vehicles described herein may include any vehicle, device, component, element, etc., that may be usefully navigated using the principles of the system disclosed herein, including, without limitation, any unmanned vehicle, manned vehicle, aircraft, ground vehicle, aquatic vehicle, space vehicle, remote-controlled vehicle, large vehicle, small vehicle, etc., unless explicitly stated otherwise or made clear from the text. For example, the autonomous vehicles described herein may include helicopters or other vehicles using horizontal propellers for lift (e.g., multi-rotor aircraft). The autonomous vehicles described herein may also, or instead, include vehicles with forward flight capability, such as fixed-wing aircraft.

While numerous aircraft platforms are possible, a suitable aircraft may be configured to operate at low density, high altitudes (greater than 12,000 ft density altitude), delivering multiple in-stride cargo drops, over round-trip distances with, for example, between 150 and 365 nautical miles, thereby reducing the number of ground transport delivered items. The aircraft may be further configured to carry 1,600 to 5,000 pounds of payload internally (with, for example, some internal capacity being allocated for CASEVAC). The aircraft may travel at, for example, speeds of between 110 and 250 knots. Within the terminal area of 5 nautical miles, the aircraft may be configured to descend and land within a two to four minute window/timeframe and to execute an autonomous landing as close to the requested site as possible (e.g., an objective of less than 1 meter error from a computer-designated landing site center point) without overflight of the landing zone (e.g., the vehicle executes a straight-in approach without a first pass). In addition, the aircraft may be able to operate at night (thus facilitating operation 24 hours a day, 7 days a week) in possibly satellite-denied settings (e.g., preventing communication and/or satellite-based geo-location such as that provided by the Global-Positioning System, denoted 'GPS-denied'), and in all types of environments, including steep and rugged terrain, instrument meteorological conditions (IMC) and non-icing conditions, high and hot environments, and in dust and sand conditions with minimum visibility. The aircraft may be configured to operate in weather conditions that exceed those of manned flight capabilities. While the forgoing describes the performance traits of an example aircraft, those of skill in the art would recognize that the package delivery system's sensor package and supervisory control system may be integrated and physically mounted on a number of different aircraft platforms as desired for a particular need.

As illustrated in FIG. 1, an aircraft 102 can be configured to autonomously detect and execute an aircraft landing to an unprepared landing zone (LZ) 104, while simultaneously negotiating and navigating threats and obstacles (e.g., vegetation, terrain, buildings, etc.), potentially requiring evasive maneuvering. The landing zone (LZ) 104 may have a radius of, for example, 50-150 meters. Within said landing zone (LZ) 104 are one or more touchdown zones, including, for example, a combat outpost (COP) touchdown zone (TZ) 106 designated by ground personnel using (e.g., via a COP interface at the COP 110) and one or more alternate touchdown zones (ATZ) 108. Each touchdown zone may have a radius of, for example, 1 to 50 meters, more preferably 5 to 25 meters, and most preferably about 10-20 meters. In operation, the package delivery system evaluates the area surrounding the COP-designated touchdown zone (TZ) 106 designated by the operator at COP 110 (e.g., via a HSI device). If the COP-designated touchdown zone (TZ) 106 is deemed unsuitable for touchdown, an alternate touchdown zone (ATZ) 108 may be identified. One or more alternate touchdown zones (ATZ) 108 may be identified by the package delivery system or an operator, including a field operator 116 or other ground personnel based at the combat outpost (COP) 110, a remote main operating base (MOB) 112, and/or a forward operating base (FOB) 114.

The package delivery system may be configured to detect and to avoid obstacles (both static and dynamic) in flight, as well as in the descent-to-land phase, in a potentially satellite-denied environment. Further, a consideration of the package delivery system is the approach, descent, and landing phase, so the intent for obstacle avoidance is to consider navigation in low-level flight envelopes. Such obstacles could be static (e.g., towers, trees, building, etc.) or dynamic, (e.g., no fly zones due to enemy activity, other vehicles, etc.). The package delivery system may be further configured to perceive physical features of the ground to negotiate any conditions that could prevent a safe approach and/or landing of the aircraft 102 (e.g., unsafe/unstable ground composition, marshy/muddy ground, vegetation, and/or water) and able to negotiate sloped landing sites. The package delivery system may be further capable of generating complete flight paths from launch to landing (or touchdown), which, in certain aspects, may be modifiable by a human operator (e.g., ground personnel) in a supervisory control role dynamically (e.g., in real time or near real time), and to generate and execute new paths as dictated by mission plan data contingencies.

The aircraft 102 may be capable of GOAL-based supervisory control with an unobtrusive device from a variety of operators with no specialized training as well as from various locations (e.g., field personnel, medical personnel, supply personnel, command center personnel, etc.), which could be beyond-line-of-sight (BLOS) from the launch location. Therefore, an advantage of the package delivery system is that it allows an operator with no special skills to supervise and request services from via the package delivery system. The package delivery system may be configured to operate in environments that currently present significant risks to manned aircraft (e.g., weather, threat, terrain, etc.), and, ideally, to operate in environments that manned aircraft cannot safely operate (e.g., high wind, steep terrain, low visibility, etc.). The package delivery systems may be monitored and supervised through a ground control station with mission planning capabilities from a remote operations center. Thus, as will be discussed below, an intuitive HSI device may also be employed.

The package delivery system may be configured to operate in meteorological or operating conditions that may limit traditional manned cargo delivery, especially in austere terrains with low visibility due to dust, precipitation, and fog. Three interfaces for interaction with the package delivery system include, for example: (1) operations center ground control stations; (2) ground personnel (e.g., field operators); and/or (3) vehicle-mounted systems for ground communication.

Figure 2:
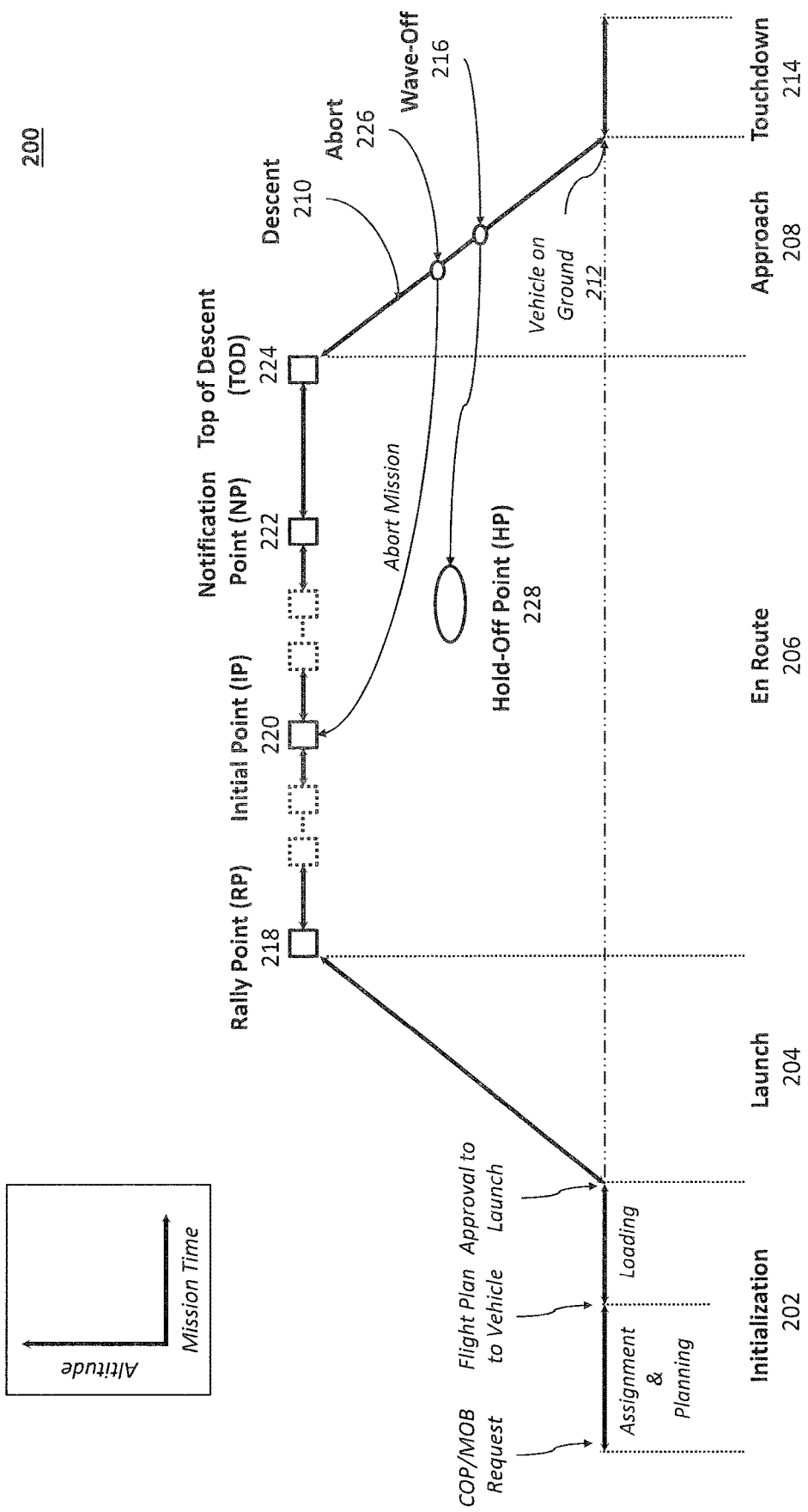
FIG. 2 illustrates a time-based diagram of various example mission phases for the aircraft of FIG. 1.

FIG. 2 illustrates a time-based diagram of the various mission phases 200. Specifically, the flight mission generally comprises five phases; including initialization and configuration 202, launch 204, en route 206, approach 208, and touchdown 214. Each of these phases will now be described in greater detail.

Initialization and Configuration 202.

Upon power-up, the package delivery system's software initializes the hardware, runs a built-in test, and reports the results. Once initialized, the processor may wait for a mission (e.g., in the form of mission data) to be uploaded, or otherwise received, at the aircraft 102. For example, the main operating base 112 may transmit to the aircraft 102 mission data that may include a set of routes (e.g., per NATO Standardization Agreement 4586 (STANAG-4586)), such as: (1) launch route; (2) approach route; (3) flight route; (4) contingency A; and (5) contingency B. STANAG-4586 is a North Atlantic Treaty Organization (NATO) Standard Interface of the Unmanned Control System (UCS) UAV interoperability. The standard includes data link, command and control, and human/computer interfaces. After the mission data has been uploaded to the mission manager, the mission manager may send the mission data to the route and/or trajectory planner.

Launch 204.

The aircraft 102 may be equipped with an autonomous normal flight mode, a piloted flight mode, and/or a supervisory flight mode. During autonomous normal flight mode, the aircraft 102 may be commanded by the main operating base 112 to launch and follow a predefined launch route in accordance with, for example, the mission data previously received by the aircraft 102. Thus, according to one aspect, the following sequence of events may occur to navigate the aircraft 102 to the rally waypoint 218: (1) the aircraft's switch may be set to autonomous (whether a physical switch or remote command); (2) the main operating base 112 sends a launch command to the vehicle management system (VMS); (3) the VMS commands the flight control system (e.g., a system having a flight controller operatively coupled with one or more flight components, and one or more sensors) to execute a launch and forwards the command to the mission manager; (4) the mission manager transitions from ground to launch mode and waits for a launch complete message from the flight control system; (5) the trajectory planner sends trajectory commands to the flight control system to guide it to the rally waypoint 218; and (6) the aircraft arrives at the rally waypoint 218. Alternatively, during piloted flight mode, the aircraft may be piloted (e.g., remotely) directly to the rally waypoint 218 or to the initial point 220, hence there may be no need for execution of the launch route and/or sequence. In certain aspects, the autonomous normal flight mode may be overridden by a pilot. For example, if the package delivery system appears to be malfunctioning, or immediate action is needed, the pilot may remotely and quickly regain control of the aircraft using mechanisms typically in place for optionally piloted and test aircraft.

To maintain the same software for both autonomous and piloted mode scenarios, the following sequence of events may be employed to navigate the aircraft 102 to the initial point 220: (1) the aircraft 102 internal switch may be set to manual; (2) the pilot completes takes off; (3) the mission sequencer detects that the aircraft 102 has taken off without a launch command and automatically transitions to a "FlyLaunchRoute" mode; and (4) the pilot flies the aircraft 102 to the rally waypoint 218, at which point the aircraft 102 may resume autonomous normal flight mode.

En Route 206.

If the aircraft 102 reaches the rally waypoint 218 autonomously, the aircraft 102 may automatically transition to the flight route set forth in the mission data and begin autonomously executing that flight route. Thus, once in autonomous mode, the aircraft 102 can autonomously execute the flight route because it has determined that it has completed the launch route 204 phase as it has reached the rally waypoint 218. The aircraft 102 can autonomously execute the flight route, request landing confirmation at the notification waypoint 222, and execute steps in accordance with the process as described with regard to FIG. 4.

If the aircraft 102 had been manually piloted to the rally waypoint 218, the following events may occur in order to transition to autonomous flight. The main operating base 112 may first send a STANAG-4586 Flight Vehicle Command and Status Message #42, Vehicle Operating Mode Command to the VMS, thereby putting it in loiter mode, at which point the aircraft 102 may execute the loiter pattern until further commanded. For example, the main operating base 112 may send a STANAG Vehicle Mode #42, commanding the aircraft to waypoint mode, at which point the pilot need not interact with the package delivery system. Alternatively, the aircraft pilot may put the aircraft in autonomous mode. In yet another alternative, the aircraft 102 may be configured to enter autonomous mode automatically once it arrives at a predetermined location (e.g., rally waypoint 218). After the aircraft 102 has landed during the touchdown 214, the pilot may then launch again and fly back to the initial point 220 and repeat the process.

Approach 208 and Touchdown 214.

Once landing confirmation has been received by the package delivery system at the notification waypoint 222, the aircraft 102 may execute a descent procedure 210, starting at the top of the descent (TOD) point 224 through the vehicle on ground point 212. During the descent procedure 210, the aircraft 102 relies on the package delivery system to identify and land at a predetermined touchdown zone (or alternative touchdown zone), while determining if a wave-off command has been received by the package delivery system.

Figure 3A:
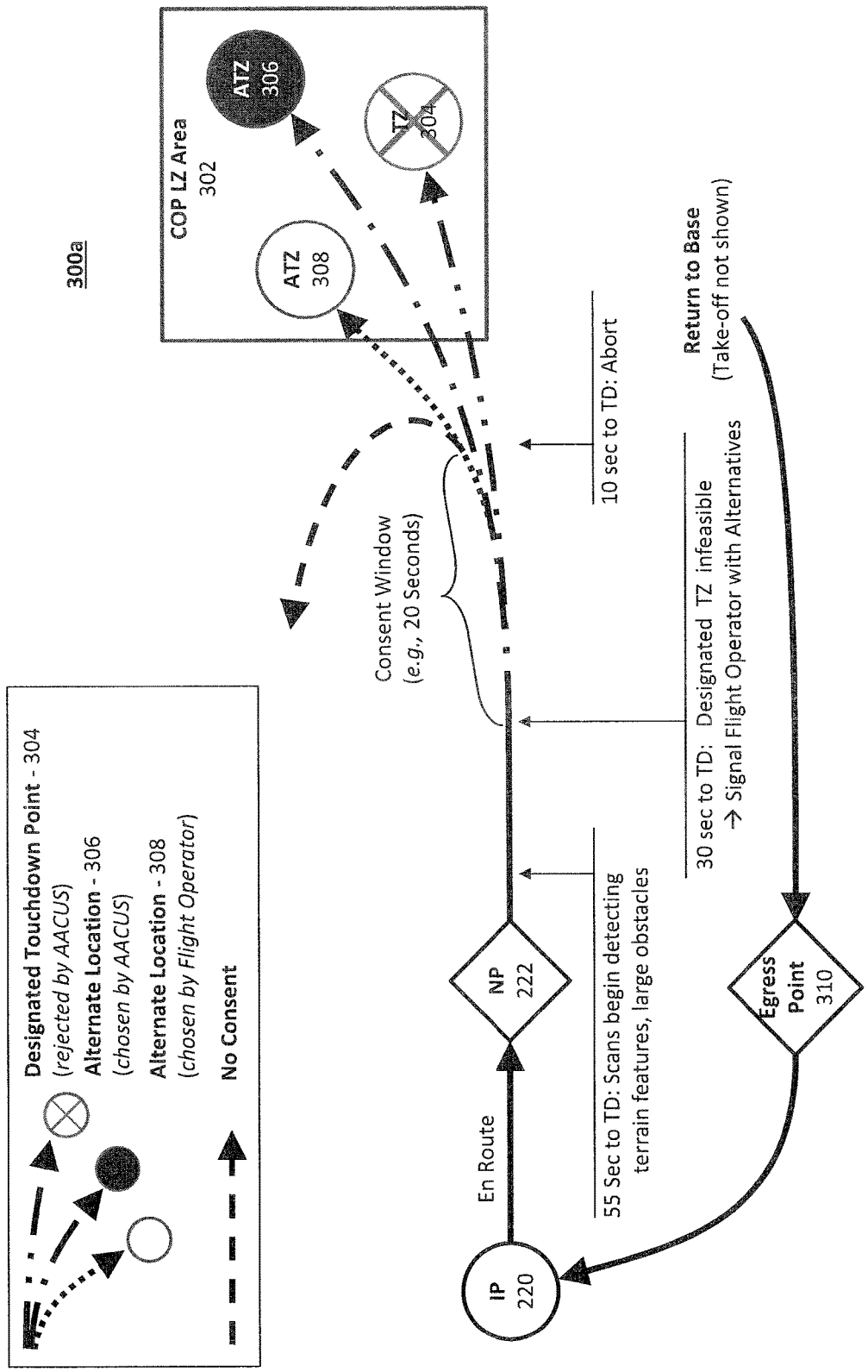
FIGS. 3a through 3c illustrate further detailed diagrams of example mission phases for the aircraft of FIG. 1.
Figure 3B:
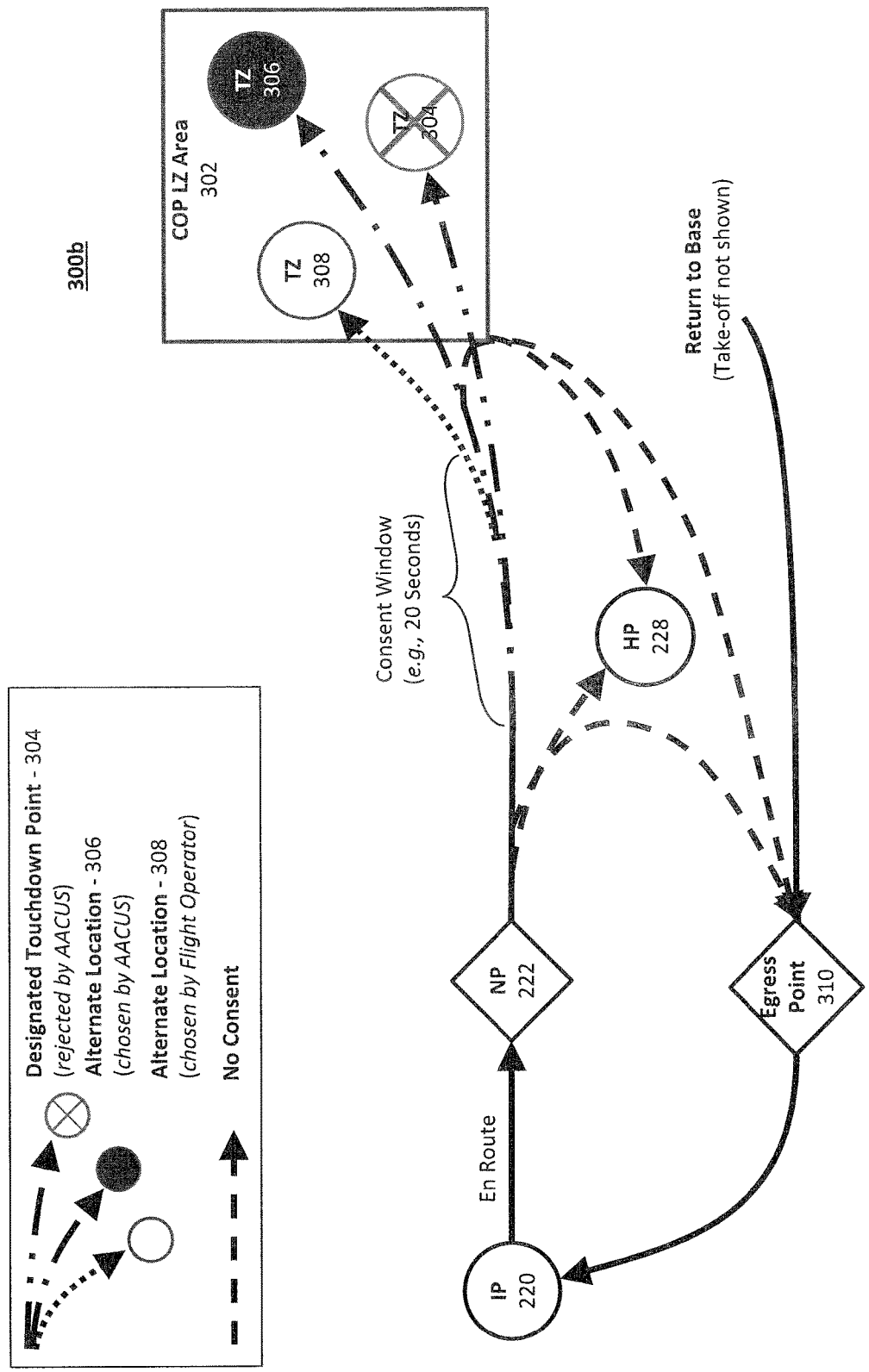
Figure 3C:
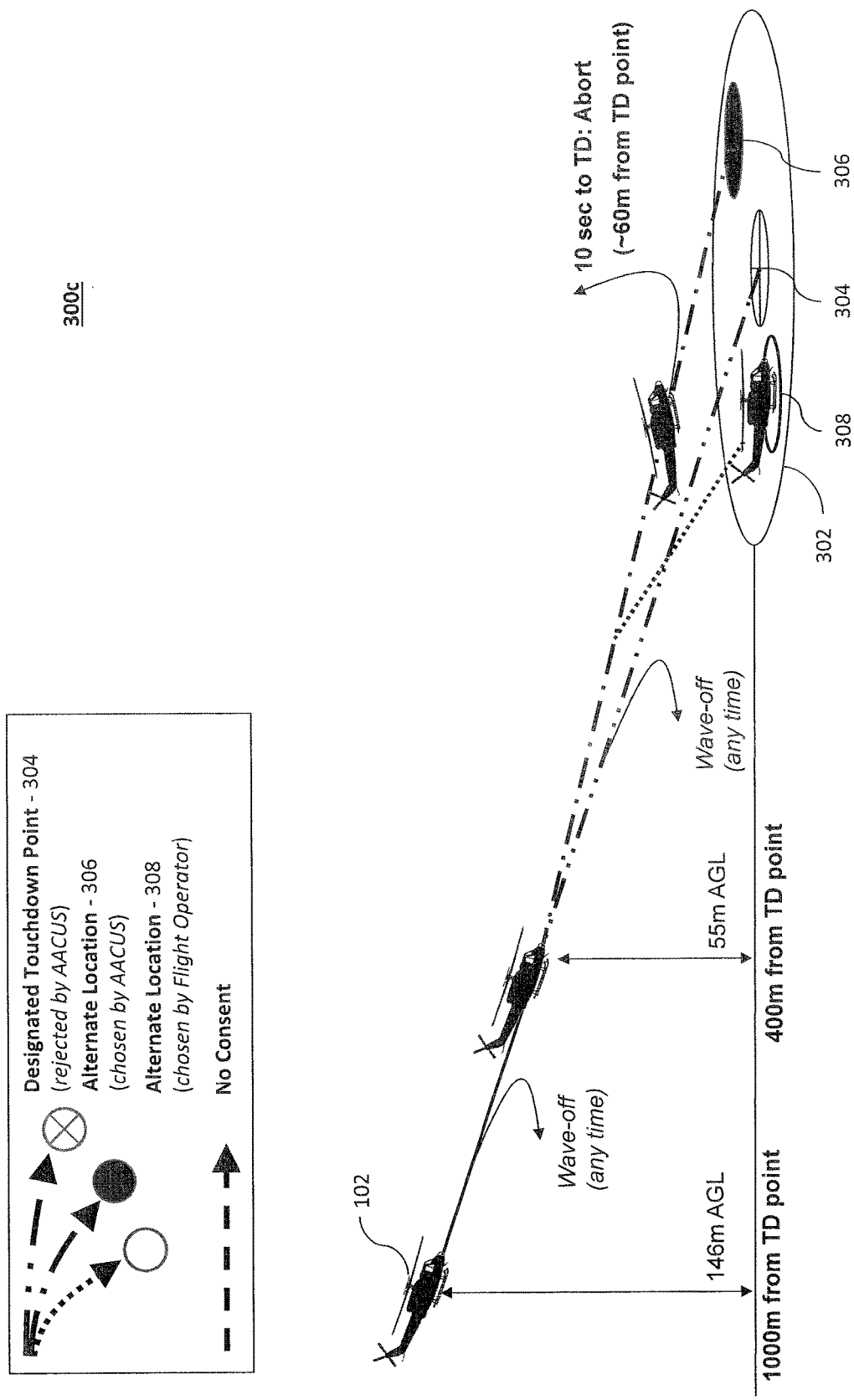

For example, turning now to FIGS. 3a through 3c, when the aircraft 102 is a first predetermined distance from the touchdown zone (e.g., 1 km) and/or a first predetermined time from the touchdown zone (e.g., 55 seconds), the aircraft 102 may begin scanning the ground (e.g., the landing zone (LZ) 104) using the sensor package to detect, for example, terrain features and large obstacles. When the aircraft 102 is a second predetermined distance from the touchdown zone (e.g., 400 m) and/or a second predetermined time from the touchdown zone (e.g., 30 seconds), the aircraft 102 determines whether the designated touchdown zone 304 is feasible. If the package delivery system determines that the designated touchdown zone 304 is infeasible, the package delivery system may identify one or more alternate touchdown zones 306, which may be communicated to the operator (e.g., the HSI device) for consideration and/or approval. Throughout this landing procedure, the aircraft 102 may receive, or otherwise detect, a wave-off command (e.g., from the HSI device).

Between the second predetermined distance/time and a third predetermined distance/time from touchdown 214 (e.g., 60 meters, 10 seconds), the package delivery system may identify an alternate touchdown zone 306 and inform the operator (or pilot) of the alternate touchdown zone 306 via the HSI device. In response the operator may (1) approve the alternate touchdown zone 306, (2) designate a second alternate touchdown zone 308, (3) wave-off the aircraft 102, (4) abort the mission, or (5) do nothing. If the operator fails to act (e.g., provide an instruction) within a predetermined time period (e.g., between 5 and 60 seconds, more preferably 10 seconds and 30 seconds) from touchdown 214, the mission may be automatically aborted. If the operator chooses to abort the mission (explicitly or by failure to act), the aircraft 102 may be directed to a hold-off point 228, or an egress point 310, which will ultimately direct the aircraft 102 to navigate to a predetermined point, such as the initial point 220.

FIG. 4 illustrates an example flow diagram of the various mission phases 400 from the mission up through landing. At step 402, the software initializes and, once complete, will wait for mission data to be uploaded or otherwise received. After the mission data has been communicated to the mission manager, the mission manager may send the mission data to the route and/or trajectory planner. At step 404, the aircraft 102 may be piloted, or commanded by the main operating base 112, to launch and follow the launch route. At step 406, the aircraft 102 is en route 206 and, absent further instruction, will autonomously execute the flight route, request landing confirmation at the notification waypoint 222, etc. If landing is approved, the aircraft 102 proceeds to approach and descent at step 408, where the aircraft 102 executes the descent, relying on the package delivery system to identify and land at a touchdown zone as discussed above with regard to approach 208.

If the package delivery system determines that the designated touchdown zone 304 is infeasible at 408, the package delivery system will identify one or more alternate touchdown zones 306 and await approval at step 414. At step 414, an alternate touchdown zone may be provided, directing the aircraft 102 to land at said alternate touchdown zone at step 410. Alternatively, the aircraft 102 may be waved off, causing the aircraft 102 to execute to wave-off operation at 416. In yet another alternative, the mission may be aborted (step 420), either via a command from the flight controller or a time out, thus causing the aircraft 102 to return to a predetermined location, such as the base. At any of steps 406, 408 and 410, the aircraft 102 may receive a wave-off command, whereby the aircraft 102 may be directed to a hold-off point 228 (step 416). The aircraft 102 may then loiter (step 418) until the mission may be aborted (step 420) or a retry may be attempted. If the aircraft 102 determines that the designated touchdown zone 304 is feasible at 408, the aircraft 102 may proceed to approach at step 410, where the aircraft 102 may execute the landing procedure at 410. Once the aircraft 102 is on the ground, the aircraft 102 is deemed to have landed (step 412), whereupon the UGV may be employed to perform ground operations. Once the ground operations are completed, the aircraft 102 may then again initialize (step 402) for a new mission, or to return to base. Therefore, one of skill would appreciated that additional steps may be performed between steps 412 and 402.

Figure 5A:
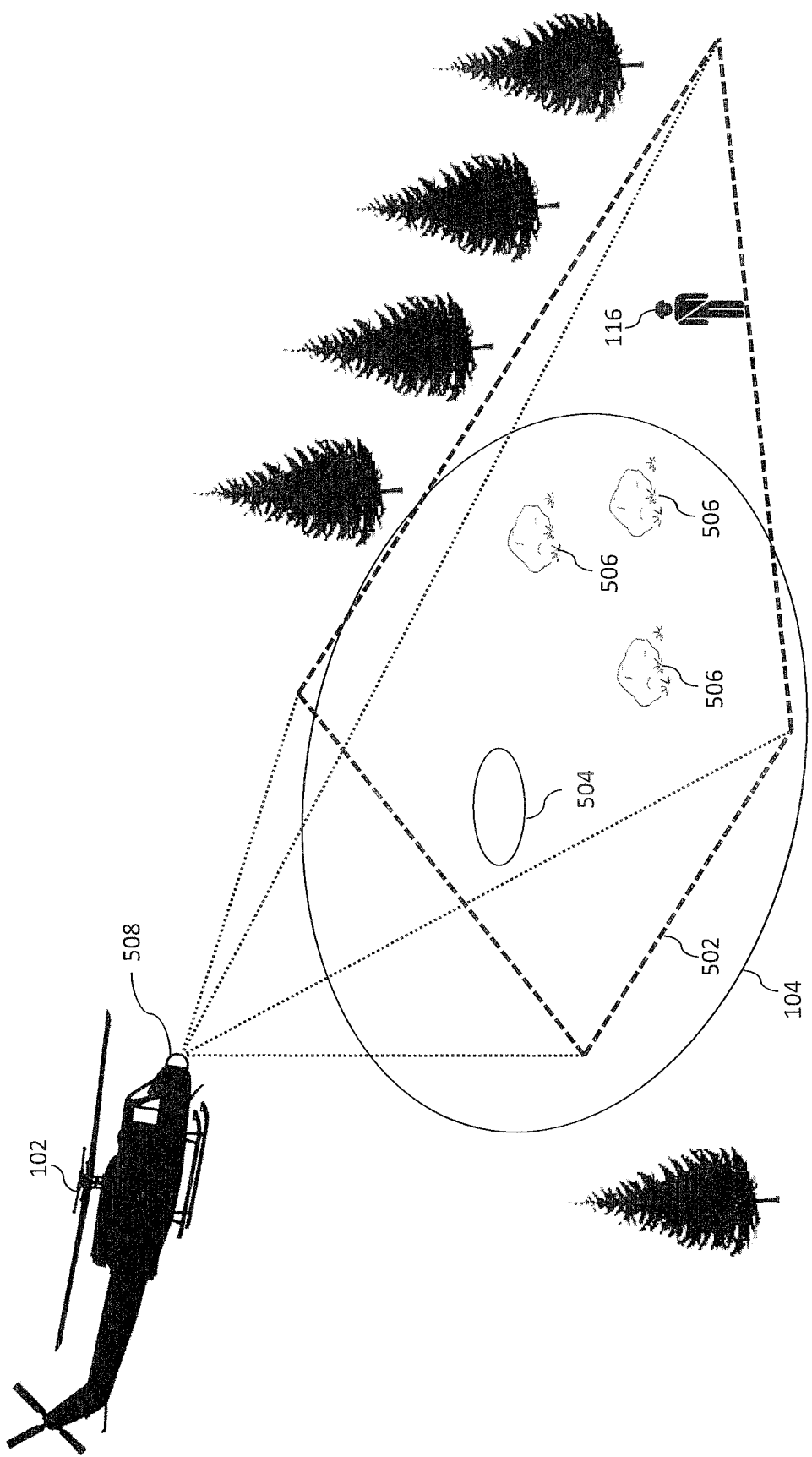
FIG. 5a illustrates an example package delivery system with an aircraft on its approach to a field operator on the ground.

FIG. 5a illustrates the aircraft 102 on its approach to a field operator 116 on the ground. During the approach 208, the aircraft 102 can scan the terrain of a scan region 502 to generate terrain data identifying, inter alia, landing zones, obstacles 506, terrain features, etc. For example, the terrain data may include a map with landmarks and terrain details. In addition to identifying landing zones 504, the terrain data may also be used to define one or more navigational land routes 118 for the UGV between the selected touchdown zone 504 and the field operator 116. For example, the aircraft 102 may scan the region 502 via a sensing and perception payload 508 during the approach 208 phase. The sensing and perception payload 508 may be mounted to the aircraft 102 (e.g., toward the front of the fuselage) via a gimbal system to enable the sensing and perception payload 508 to be oriented toward the scan region 502. As illustrated, the scan region 502 may be the geographic area around, and including, the touchdown zone 504 that was selected for landing. The field operator 116 may be near, for example, the COP-designated touchdown zone (TZ) 106, the alternate touchdown zone (ATZ) 108, etc. The scan region 502 may include the landing zone 504, or portion thereof (i.e., overlap with). Notable, the scan region 502 can extend beyond that of the landing zone 504 because, while certain geographic areas may be unsuitable for the aircraft 102, the geographic area may be suitable for UGV navigation and, therefore, may be imaged. Further, depending on the field of view afforded by the sensing and perception payload 508, which may be impacted by the approach angle and ground terrain, the scan region 502 may or may not be large enough to encompass both the touchdown zone 504 and the field operator 116. For purposes of illustration, however, the field of view is illustrated to include the field operator 116.

An objective of the package delivery system is to deliver packages to the field operator 116 without exposing the field operator 116, or other ground personnel, to the generally unobstructed area around the touchdown zone 504. Therefore, upon landing the aircraft 102 at the touchdown zone 504, one or more unmanned ground vehicles (UGVs) 512 can exit the aircraft 102 and travel to the field operator 116's location, deliver the package, and return to the aircraft 102. The UGVs 512 may egress from and ingress to the aircraft 102 using one of multiple methods. To that end, the aircraft 102 may include powered ramps or other infrastructure that enable the UGV 512 to reenter the aircraft 102. For example, the aircraft 102 may include a ramp 520 to enable the UGVs 512 to drive in and out of the UGV's 512 cargo bay. Alternatively, the aircraft 102 may be fitted with a lifting mechanism, which may be installed onto the aircraft 102 (e.g., adjacent a door to the cargo bay) and powered using one or more hydraulic or electric actuators to raise and lower the UGV 512 in and out of the cargo bay. Example lifting mechanisms include, for example, cranes, winches, or lift gates, which may include a platform to support the UGV 512 that can be raised or lowered. In another example, the UGV 512 (e.g., a legged robot) may be configured to jump from, or into, the cargo bay, thereby obviating the need for a ramp 520 or a lifting mechanism. In operation, the UGV 512 may be secured inside the aircraft 102 during flight, but configured to quickly egress and ingress. The UGV 512 may be secured within the aircraft 102 using, for example, blocking & bracing, strapping, lashing, or a fastener. For example, an electromagnet may be used to selectively secure and release the UGV 512 from the aircraft 102.

As illustrated, the UGV 512 can be configured to reliably load, carry, and unload packages. To that end, the UGV 512 may include a chassis 512a and a container 512b, which may be modularly coupled to the chassis 512a, to house the package(s). Alternatively, the package(s) may be secured directly to the chassis 512a. The chassis 512a generally includes the powertrain to drive to the UGV 512. The powertrain may include, for example an engine (or electric motor(s)), batteries, transmissions, drive shafts, differentials, and the final drive mechanism (drive wheels, continuous track, legged robot, etc.). The UGVs 512 may be, for example, a vehicle with wheels, continuous tracks (e.g., tank tread), and/or legs (e.g., a legged robot). The packages may be pre-loaded prior to the aircraft 102 arriving at the touchdown zone 504, or loaded upon request by the field operator 116, in which case the UGV 512 may be further configured with a robotic arm to manipulate/unload the packages (or container 512b) from the aircraft 102

The UGV 512, via the chassis 512a, should be configured to travel to the field operator's 116 location, while traversing a wide range of terrain types (e.g., grass, concrete, dirt, sand, rubble, etc.) The UGV 512 may be figure configured with a sensor payload (e.g., optical payload 512c) to assess scenarios that would result in low probability of mission success (e.g., obstructions, a river, ditches, etc.). If the UGV 512 detects a low-success scenario, the UGV 512 may send an alert to the aircraft 102 or the HSI device 514. Once an alert is communicated, the UGV 512 may await further instructions and, absent further instruction within a predetermine period of time, return to the aircraft 102 or a predetermined location. During the operation, the UGV 512 must operate with sufficient speed to minimize mission duration and risk as it maneuvers the navigational land route 118 to the field operator's 116 location. Moreover, the UGV's 512 behavior should be predictable to, and controllable by, the field operator 116 via the HSI device 514.

The sensing and perception payload 508 can scan the scan region's 502 terrain at a high precision (e.g., within 0.2 m accuracy) to generate the terrain data. Relying on a UGV 512 to quickly perform its own localization, mapping, and path planning over new terrain can be a challenge. To address this challenge, the UGV 512 may communicate with the aircraft 102 and the field operator 116 (e.g., via the HSI device 514), either of which may dynamically augment navigation of the UGV 512. Indeed, once on the ground, a small UGV 512 will have limited view beyond its immediate surroundings. Therefore, to perform ground delivery to the field operator 116, a processor (e.g., positioned on the aircraft 102, the HSI device 514, or the UGV 512), can generate a terrain map from the generated terrain data, which will be used to plan one or more navigational land routes 118 between the aircraft 102 and the field operator 116. In certain aspects, the processor can generate a plurality of navigational land routes 118 to be presented to the field operator 116 for approval. For example, certain navigational land routes 118 may be faster (shorter distances), but subject to a greater risk of obstacle collision. Accordingly, alternate navigational land routes may be provided to the field operator 116 via the HSI device 514 that are slower (longer distances), but have a low risk of obstacle collision.

Figure 5B:
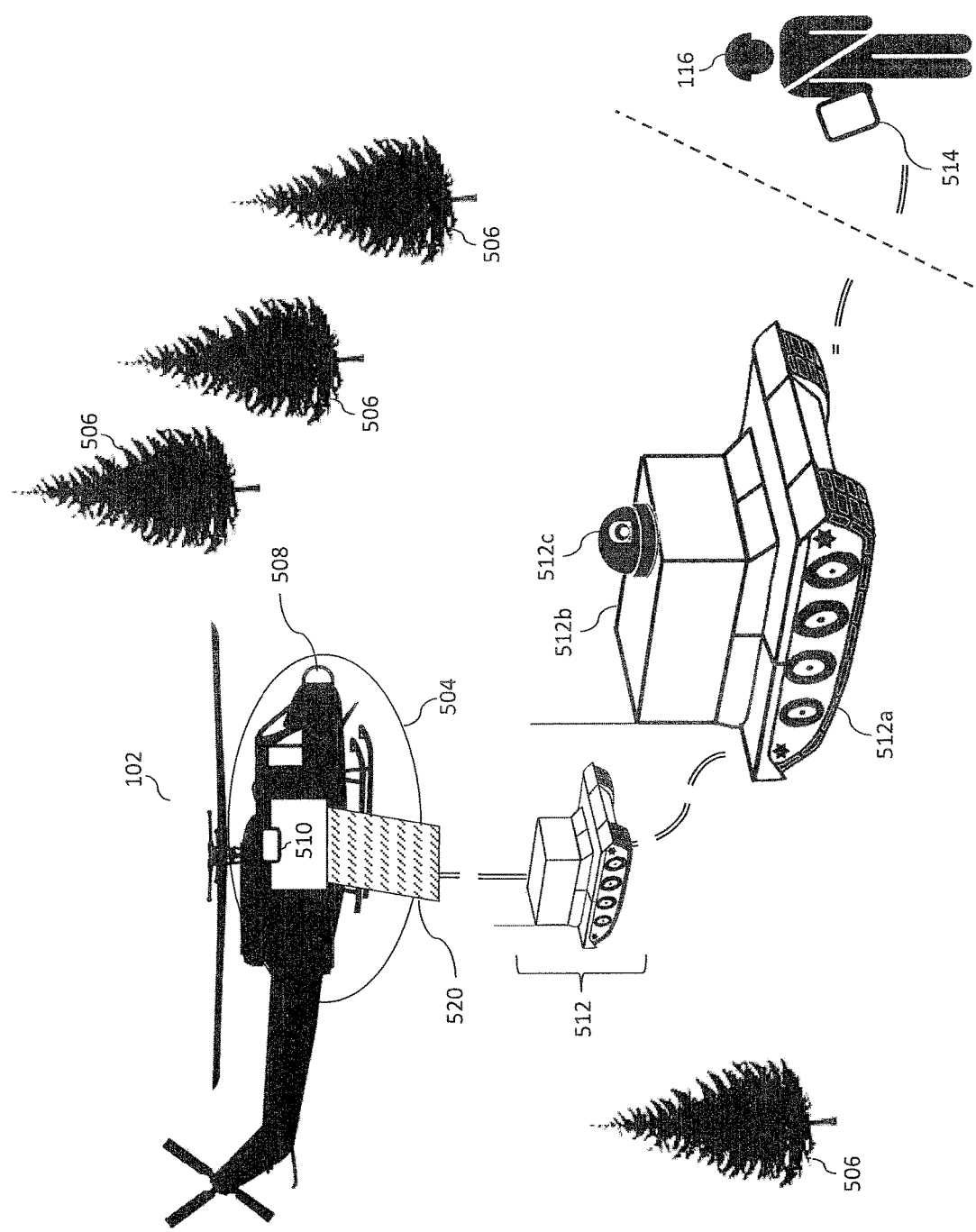
FIGS. 5b and 5c illustrate an example package delivery system with the aircraft on the ground.
Figure 5C:
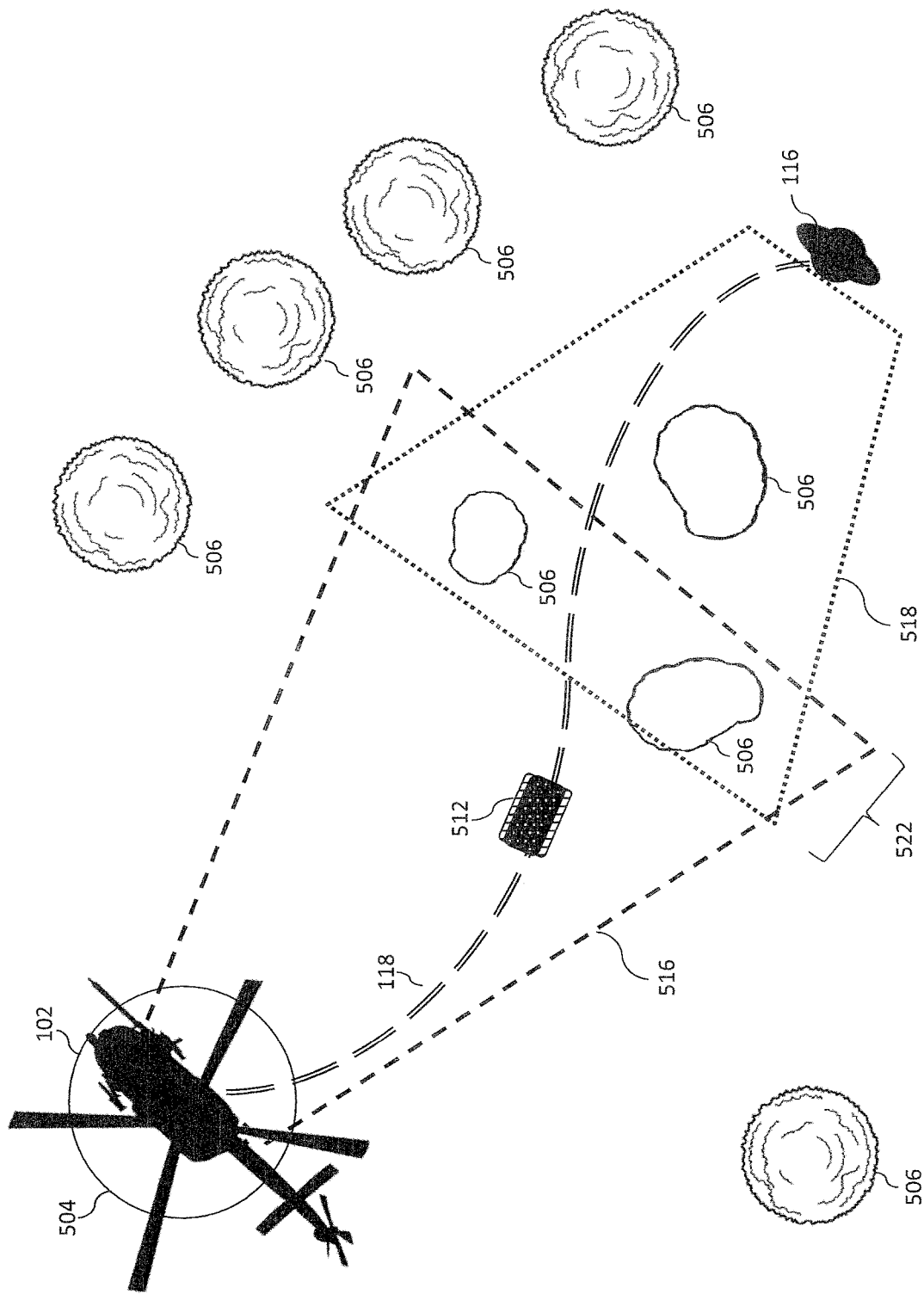

With reference to FIGS. 5b and 5c, once on the ground, the aircraft 102 can enhance the UGV 512's ability to localize itself on a map (e.g., its point along a given navigational land route 118) to aid in real-time navigation. To that end, an optical payload 510 may be positioned on the aircraft 102 to observe the UGV 512 as it traverses the navigational land route 118 to the field operator 116. The optical payload 510 may also be used to alert the UGV 512 if collision with an obstacle 506 is anticipated. The optical payload 510 may be positioned near the top of the aircraft 102 (e.g., above the cargo bay doors, but below the rotors) to provide guidance within its aircraft field of view 516. The optical payload 510 may include, for example, Light Detection and Ranging (LIDAR), stereo vision, etc. Additionally, the UGV 512 can use its location relative to the aircraft 102 to localize itself on the map. Indeed, the aircraft 102, which may remain static, can provide a reference point for the mobile UGV 512 during localization processes.

The field operator 116 may also have an operator field of view 518 that can be used to aid the UGV 512 along its navigational land route 118. If desired, the field operator 116 can observe and modify the navigational land route 118 of the UGV 512 via the HSI device 514 to, for example, avoid obstacles 506 or adopt a different navigational land route 118. For example, the field operator 116 may take direct remote control of the UGV 512 and view video dynamically captured by the UGV 512 or the aircraft 102. Accordingly, the UGV 512 may further include an optical payload 512c, which may be controlled (e.g., adjusted, zoomed, rotated, pivoted, panned, etc.) via the aircraft 102 or the HSI device 514. To that end, the optical payload 512c may be coupled to the UGV 712 via a gimbal system. Accordingly, the UGV 512 may be "dumb" in that it merely follows navigational commands from the aircraft 102 or the HSI device 514, while supplying a data feed from the its sensor payload (e.g., the optical payload 512c).

Depending on the distance between the touchdown zone 504 and the field operator 116, the aircraft field of view 516 and/or the operator field of view 518 may or may not include the entirety of the navigational land route 118. Where one or both of the aircraft field of view 516 and the operator field of view 518 include the entirety of the navigational land route 118, the UGV 512 may be monitored and controlled by a single party for the entirety of the route. However, where no single system or operator can observe the entirety of the navigational land route 118, the aircraft 102 and the field operator 116 may coordinate to augment control of the UGV 512. For example, as illustrated, the aircraft field of view 516 may cover about 70% of the navigational land route 118, while the operator field of view 518 may cover about 45% of the navigational land route 118, defining an overlapping field of view 522 of 15% of the navigational land route 118. Therefore, the field operator 116 may assume remote control of the UGV 512 during the overlapping field of view 522 using, for example, a video feed (e.g., live video) dynamically captured by the UGV 512 or the aircraft 102. In certain aspects, the field operator 116 may choose to navigate the UGV 512 even when it lies outside of the operator field of view 518 using the video feed that can be dynamically displayed on the HSI device 514 from the UGV 512 or the aircraft 102 (e.g., from the optical payload 510 or the optical payload 512c). To address conflicting navigational commands from the aircraft 102 and the HSI device 514, the UGV 512 may give deference to (i.e., prioritize) navigational commands from the HSI device 514, thereby giving the field operator 116 absolute control.

While the subject disclosure generally describes embodiments where the UGV 512 is delivered to a location (e.g., touchdown zone 504) using an aircraft 102, one of skill in the art would understand in view of the subject disclosure that other devices (e.g., vehicles) may be used to deliver the UGV 512 to a designated location (e.g., touchdown zone 504 or equivalent thereof). In certain aspects, the UGV 512 may be delivered to a location via a land vehicle. For example, the package delivery system may be deployed in urban areas to facilitate commercial package delivery. In such an example, a larger land vehicle (e.g., a van/truck), which may be autonomous, may cooperate with a small UGV (e.g., UGV 512) to deliver packages. In operation, the larger land vehicle may stop and park curbside, whereby the small UGV exits the larger land vehicle at the curbside location to transport the package from the larger land vehicle to the final destination (e.g., a door step). As with the UAV example, the larger land vehicle may still play a role in guiding the smaller UGV over and/or around complex terrain via an optical payload 510. In certain aspects, the larger land vehicle may also navigate a region (e.g., neighborhoods) while making point clouds in real (or near real) time.

Figure 6:
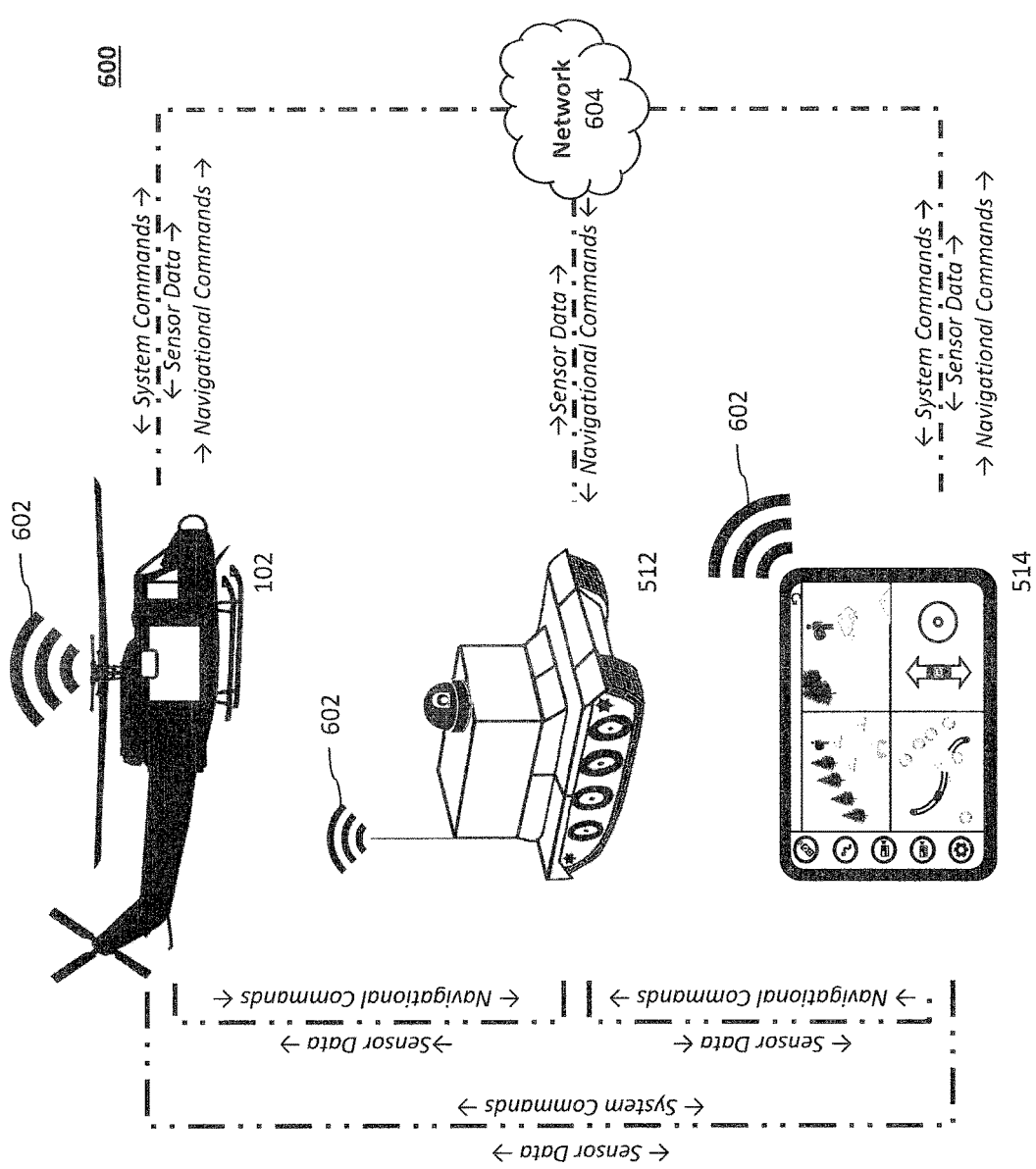
FIG. 6 illustrates an example data flow diagram for an example package delivery system.

FIG. 6 illustrates an example data flow diagram for an example package delivery system 600 having an aircraft 102, a UGV 512, and a HSI device 514 (e.g., portable electronic devices, such as smartphones, tablets, and laptop computers) or other controller (e.g., a base station). Each of the aircraft 102, the UGV 512, and the HSI device 514 may include a wireless transceiver 602 coupled with an antenna and a processor (or other circuitry) to communicate data between the various systems of the aircraft 102, the UGV 512, and the HSI device 514. The aircraft 102, the UGV 512, and the HSI device 514 may communicate data (processed data, unprocessed data, etc.) with one another using radio frequency either directly (e.g., point-to-point, point-to-multipoint, etc.) or indirectly (e.g., over a network 604, using the UGB 512 as a relay, or via a mesh-network). In certain aspects, the wireless transceivers 602 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), Military Standard 188 (MIL-STD-188), standard interface for multiple platform link evaluation (SIMPLE), etc. The HSI device 514 may facilitate monitoring and/or control of the aircraft 102 and the UGV 512.

As illustrated, each of the aircraft 102 and the UGV 512 may be configured to communicate navigational commands to the UGV 512. Sensors data (e.g., image/video feed) gathered by the UGV 512 may be communicated to each of each of the aircraft 102 and the HSI device 514. The aircraft 102 and the HSI device 514 may be configured to exchange sensor data, whether gathered by the aircraft 102 or the UGV 512. For example, sensors data gathered by the aircraft 102 may be communicated to the HSI device 514, such as video feed, terrain information, details regarding the UGV 512 and/or its payload, etc. In certain circumstances, the HSI device 514 may generate and output sensor data, such as positioning information (e.g., via a GPS transceiver). In addition, the aircraft 102 and the UGV 512 may be configured to exchange system commands, which may be used to adjust one or more settings of either device. For example, the field operator 116 may instruct the aircraft 102 to assume or cease control of the UGV 512.

FIGS. 7a through 7g illustrate an example HSI device 514 having a single touch-screen interface and, in certain aspects, a speech-recognition interface to enable vocal communication (e.g., to command the UGV 512 or communicate with another operator). The HSI device 514 is illustrated with a tool bar area 716a and a primary display area 716b. The HSI device 514 serves as a primary channel of communication between the field operator 116 and the UGV 512 to enable the field operator 116 to command and receive feedback or instructions from the UGV 512 and/or the aircraft 102. The HSI device 514 can display, via a display device (e.g., a liquid crystal display (LCD)), the current state of UGV 512 and/or of the aircraft 102 (e.g., current settings). The HSI device 514's GUI display may also be night-vision goggles compatible such that it is visible regardless of the field operator 116's eyewear.

Figure 7A:
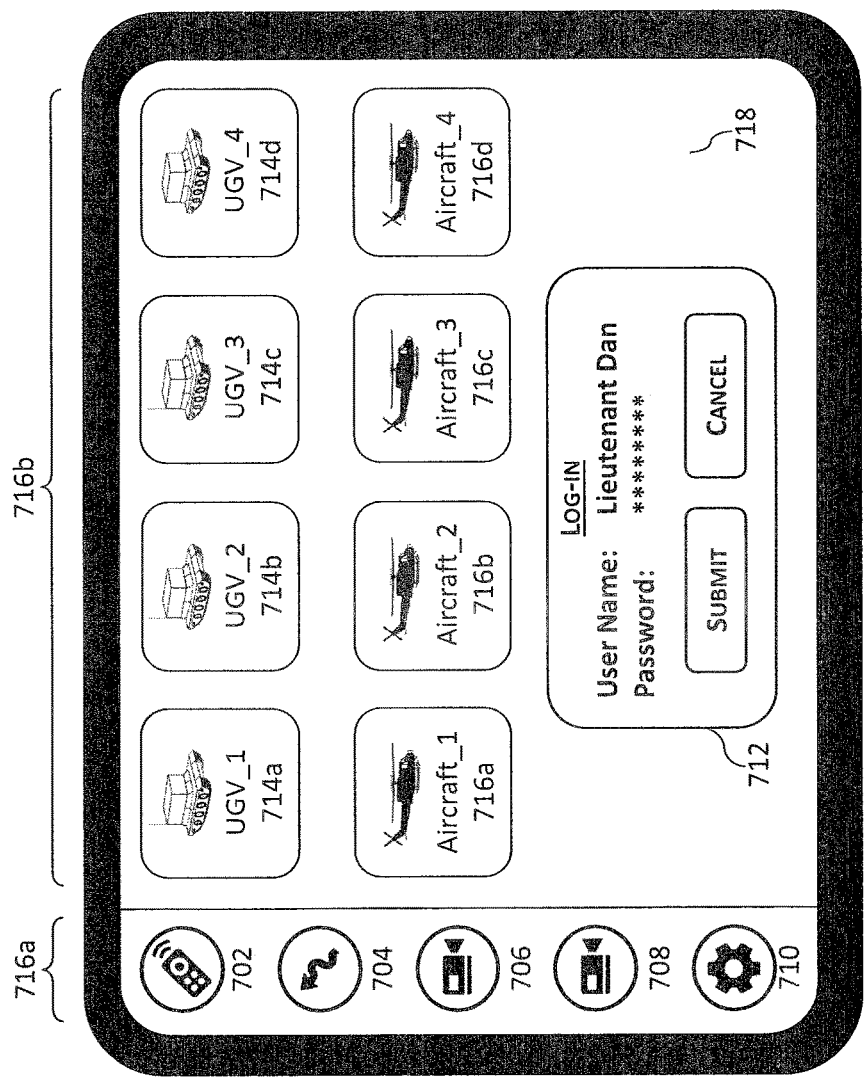
FIGS. 7a through 7g illustrate an example HSI device having a single touch-screen interface.
Figure 7B:
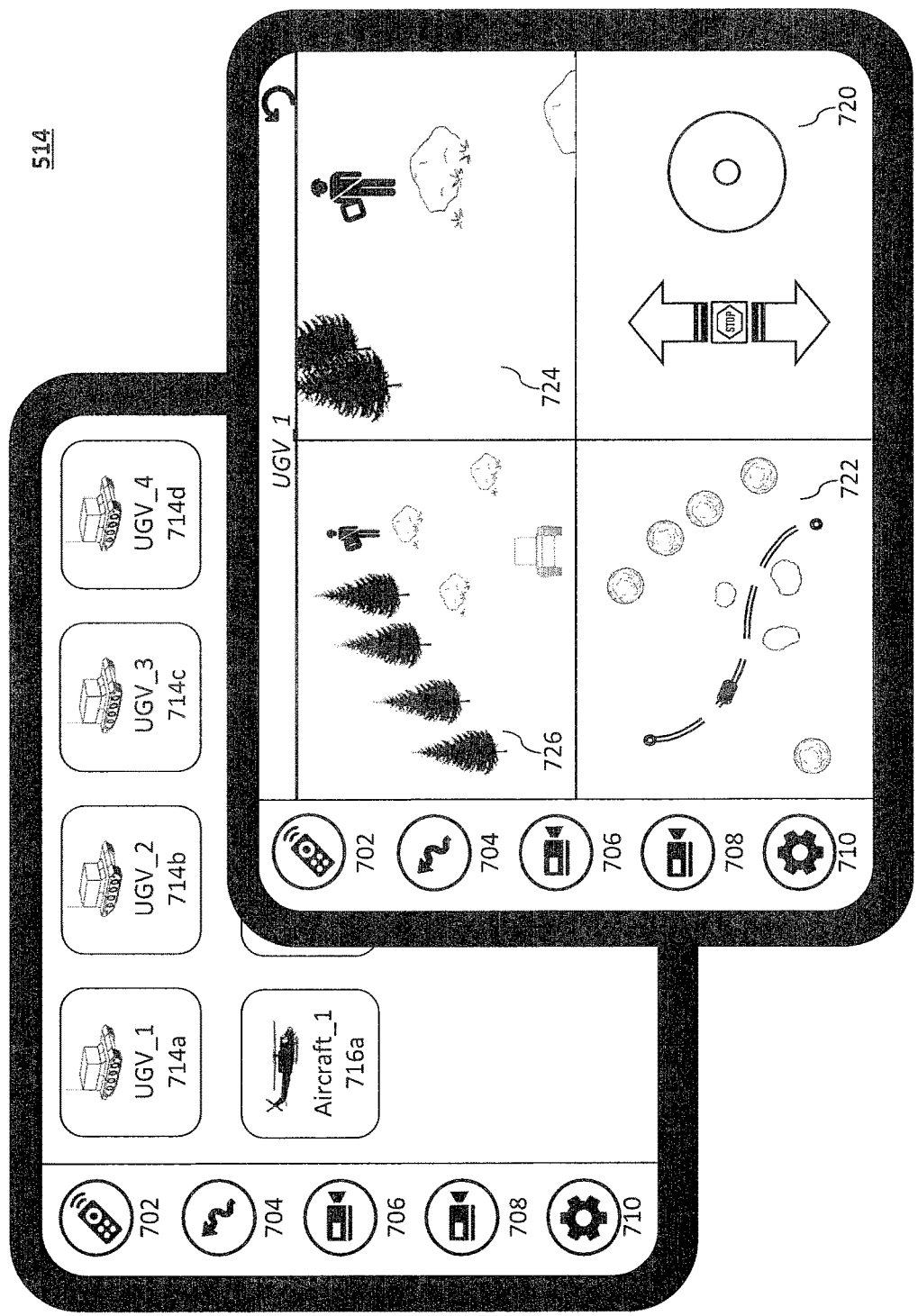

With reference to FIG. 7a, the primary display area 716b is illustrated with a home screen 718. The home screen 718 may include icons to select, for control or monitoring, the one or more UGVs 512 (e.g., via UGV selection icons 714a, 714b, 714c, 714d) and/or aircraft 102 (e.g., via aircraft selection icons 716ba, 716bb, 716bc, 716bd). The tool bar area 716a may include a plurality of selectable icons; such as a remote controller icon 702, a navigation map icon 704, a UGV video feed icon 706, an aircraft video feed icon 708, and a settings icon 710. To prohibit unwanted access to the HSI device 514, the HSI device 514 may require user authentication using, for example, a log in screen 712 to enter a user name and/or password. In other aspects, biometrics may be used to authenticate a user, such as a pulse/heart rate monitor and/or a scanner to scan a retina and/or a finger print.

Selecting the aircraft selection icon 716a, for example, can enable the field operator 116 to view and control the various aspects of a first aircraft 102 (i.e., AircraftV_1). Similarly, selecting the UGV selection icon 714a, for example, can enable the field operator 116 to view and control the various aspects of a first UGV 512 (i.e., UGV_1). To that end, the primary display area 716b may be divided into quadrants, each enabling a different function or operation for the first UGV 512. For example, the primary display area 716b may display a remote controller screen 720, a UGV route screen 722, a UGV camera screen 724, and an aircraft camera screen 726. To enlarge any one of the screens, the field operator 116 may select the associated icon from the tool bar area 716a, or select the desired quadrant (e.g., double tapping) to enlarge the view. For example, to enlarge the remote controller screen 720, the field operator 116 may select the remote controller icon 702 or select the quadrant displaying the remote controller screen 720.

Figure 7C:
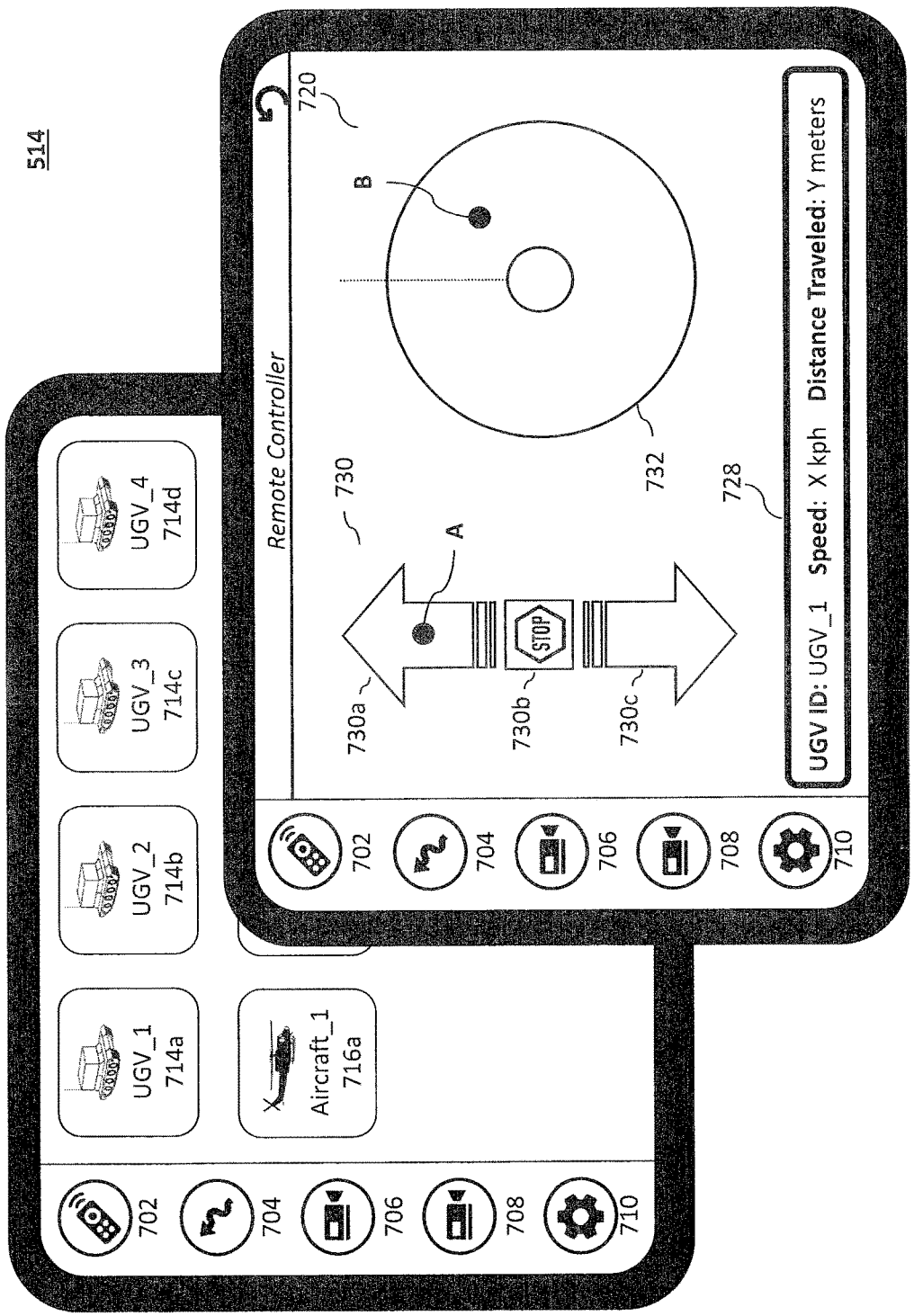

FIG. 7c illustrates an enlarged view of the remote controller screen 720. As illustrated, the remote controller screen 720 may include navigational controller icons, such as a speed controller icon 730 and a direction controller icon 732. The speed controller icon 730 my include forward speed control icon 730a to drive the powertrain (e.g., the wheels, including those that drive the continuous tracks) in a first direction, a stop control icon 730 to stop (e.g., brake) the powertrain, and reverse speed control icon 730c to drive the powertrain in a second direction (that is opposite of the first direction). To control the speed in either the first or second directions, for example, the user may engage the speed controller icon 730 at a contact point (e.g., point A), where the speed is a function of the distance between the contact point and the stop control icon 730. Point A, for example, may instruct the UGV 512 to drive in the forward direction at an intermediate speed. The direction controller icon 732 may be used to steer the UGV 512, thereby adjust its heading. For example, the user may engage the speed controller icon 730 at a contact point (e.g., point B), where the heading is a function of the contact point's angular position (e.g., between 0 and 360 degrees) on the direction controller icon 732. Point B, for example, may instruct the UGV 512 to drive to the right with a heading 22.5 degrees off center (designated in FIG. 7c as a dotted line). Together, Points A and B would instruct the UGV 512 to drive its wheels in the first direction and to steer to the right.

While the speed controller icon 730 and the direction controller icon 732 are illustrated as separate elements, they may be combined into a single controller. For example, the direction controller icon 732 may be adapted to control both speed and direction using a single contact point from the operator. For example, the distance between the single contact point (e.g., point B) and the center of the direction controller icon 732 may be used to determine speed, where a larger distance equates to a higher speed, and the angular position (e.g., between 0 and 360 degrees) may be used to determine heading of the UGV 512.

Figure 7D:
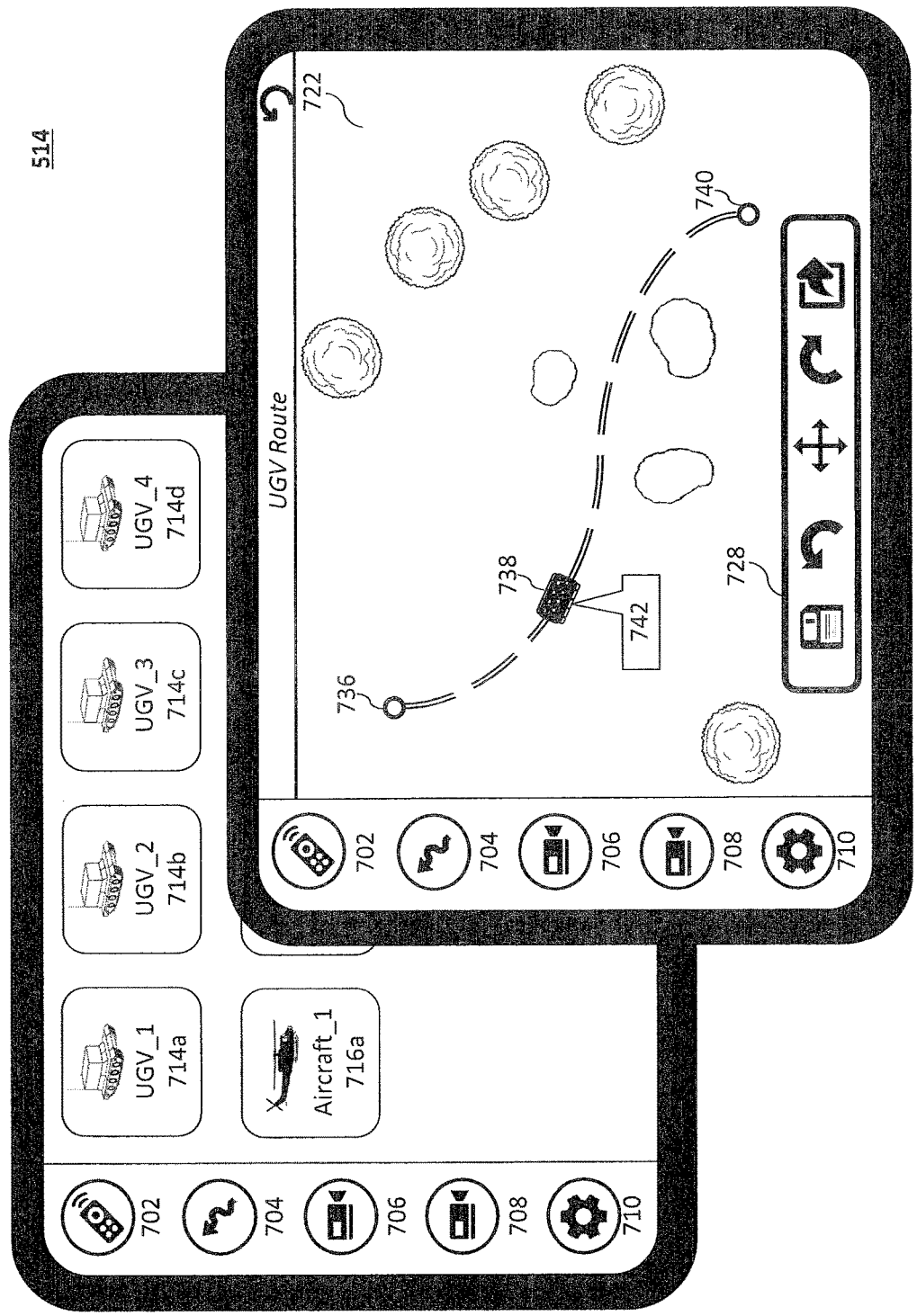

FIG. 7d illustrates an enlarged view of the UGV route screen 722. As illustrated, the UGV route screen 722 may include a map of the scan region 502 with the selected navigational land route 118 connecting the origin 736 (e.g., selected touchdown zone 504) with the destination 740 (e.g., field operator 116). As can be appreciated, the selected navigational land route 118 is designed to avoid the various obstacles 506. The progress of the UGV 512 along the selected navigational land route 118 may be indicated using a UGV icon 738. Selecting (e.g., tapping, clicking, etc.) the UGV icon 738 may cause a dialog window 742 to display, which provides the various operational conditions of the UGV 512 (e.g., speed, heading, coordinates, etc.). The UGV route screen 722 may be saved, exported, rotated, or panned using a control window 728. The area map, for example, may be saved or exported as a static image or a data set (or database) representing the navigational land route 118 and the terrain.

Figure 7E:
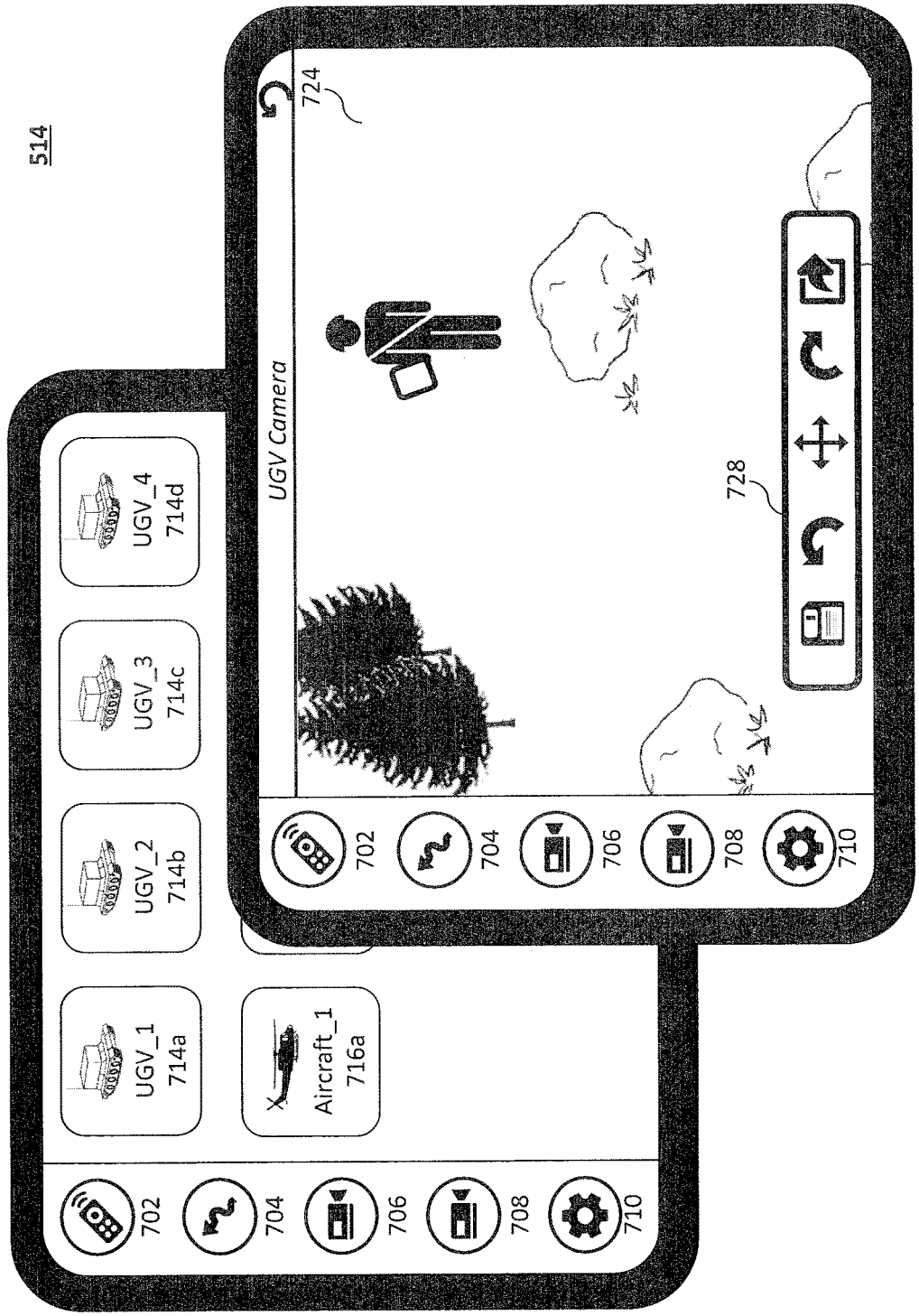
Figure 7F:
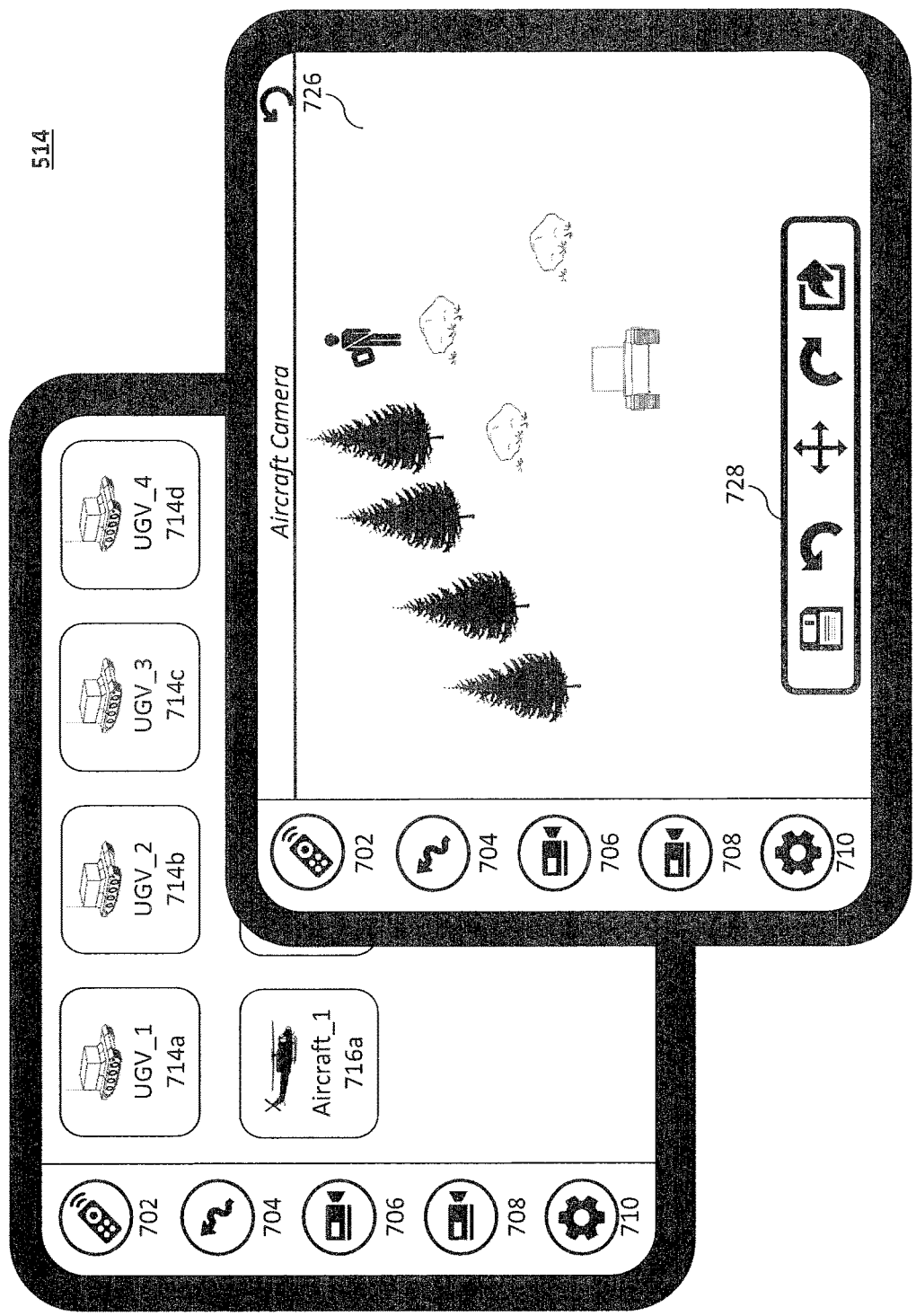
Figure 7G:
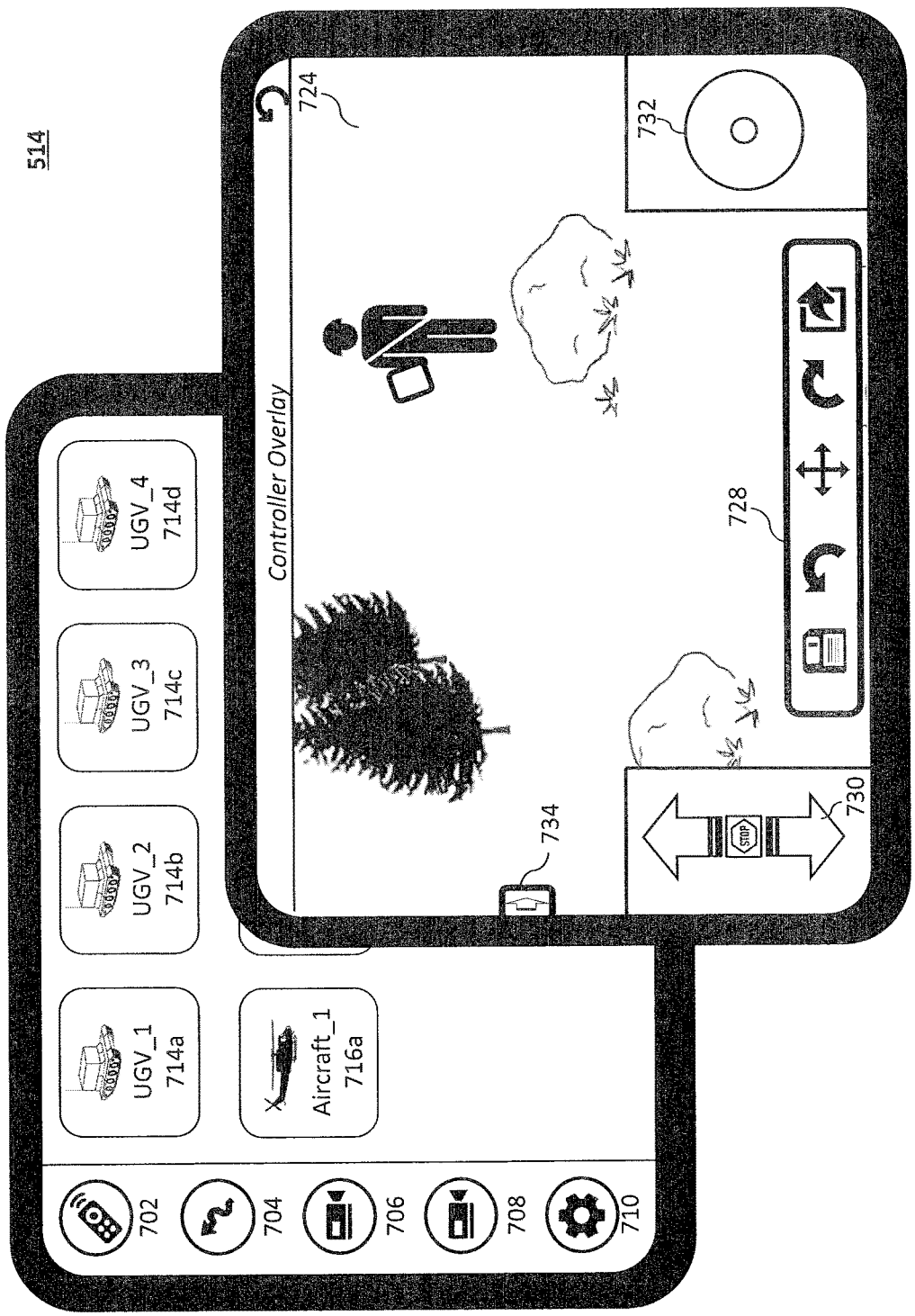

FIG. 7e illustrates an enlarged view of the UGV camera screen 724, while FIG. 7f illustrates an enlarged view of the aircraft camera screen 726. As illustrated, the UGV camera screen 724 may include a live video feed from the UGV 512 (e.g., from the optical payload 512c), and/or, to provide a second point of view, a live video feed from the aircraft 102 (e.g., from the optical payload 510). The live video feed, regardless of origin, may be over laid with information and/or various controls, such as control window 728, speed controller icon 730, and/or direction controller icon 732. Therefore, as illustrated in FIG. 7g, for example, the HSI device 514 may simultaneously display the enlarged live video feed and the various controllers, which may be used by the field operator 116 to navigate the UGV 512 to avoid obstacles 506.

As noted above, the aircraft 102 may be configured with a package delivery system to map terrain on its approach to the landing zone (LZ) 104, which may be used to aid in both selecting a selected touchdown zone 504 and mapping a route for the UGV 512. Once on the ground, the aircraft 102 can provide additional mapping using is optical payload 510, which can be mounted as high as possible on the aircraft 102. For example, a Bell UH-1 Iroquois helicopter's cargo bay ceiling is over 80 inches off the ground, which would provide a point of view higher than the UGV 512. These sensors, along with any supervisory commands from ground personnel (the field operator 116), can help guide the UGV 512.

Figure 8:
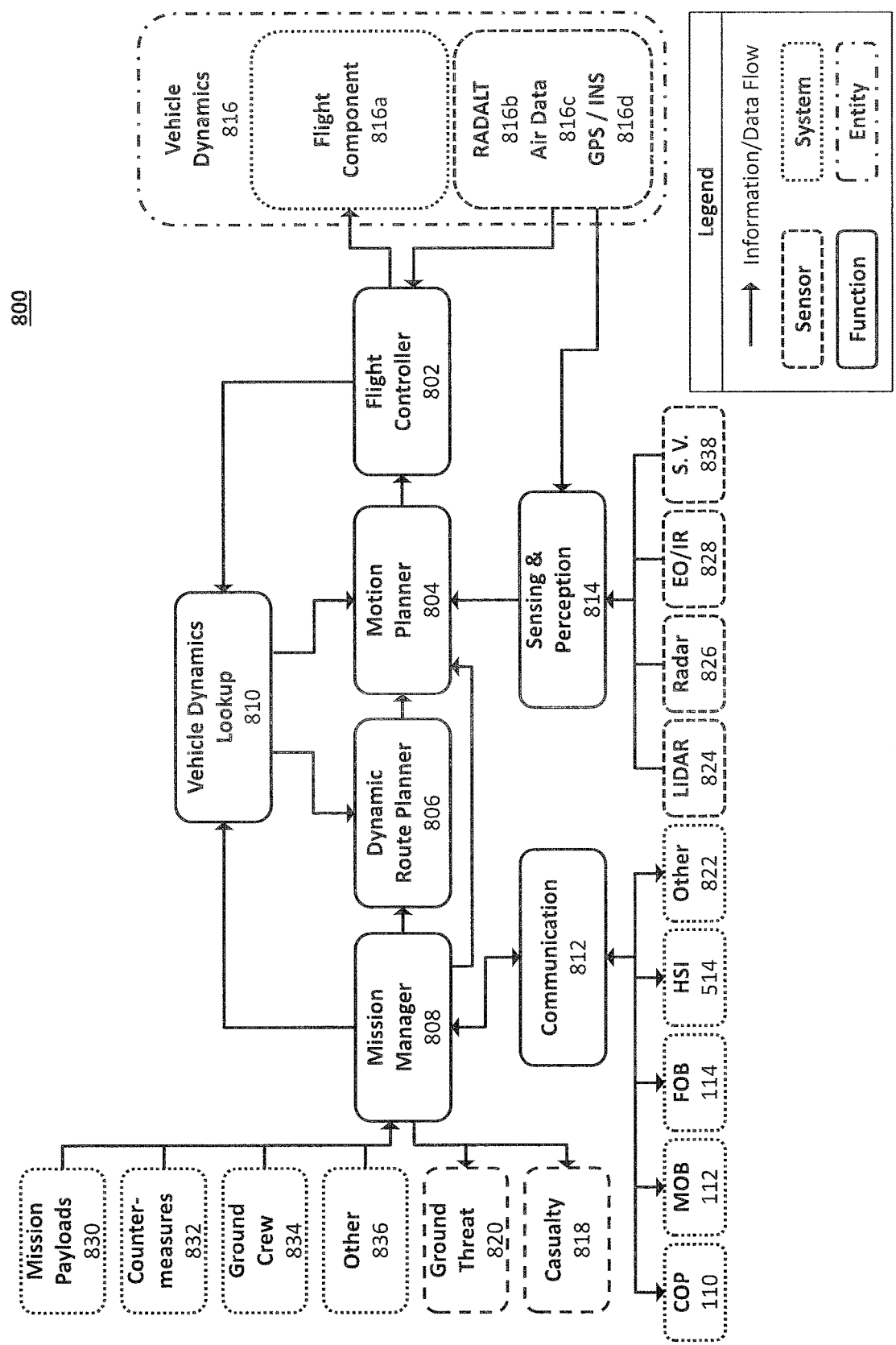
FIG. 8 illustrates a block diagram of an example package delivery system architecture.

FIG. 8 illustrates a package delivery system's architecture 800, including sensors, mission manager, communications, route and trajectory planning, and flight controls/sensors onboard the vehicles. More specifically, as illustrated, the package delivery system's architecture 800 may comprise a flight controller 802, a motion planner 804, a dynamic route planner 806, and a mission manager 808. In use, data may be communicated between two or more of the flight controller 802, the motion planner 804, the dynamic route planner 806, and the mission manager 808 directly, or via the vehicle dynamics lookup module 810. For example, the mission manager 808 may (1) communicate task and constraint data to the dynamic route planner 806; and/or (2) communicate route and task data to the motion planner 804. The dynamic route planner 806 may similarly provide route and task data to the motion planner 804 based on data (e.g., constraints) received from the vehicle dynamics lookup module 810. The motion planner 804 may provide trajectory data to the flight controller based, at least in part, on data received from a sensing and perception system 814 and/or the vehicle dynamics lookup module 810. The vehicle dynamics lookup module 810 may be further configured to receive data (e.g., mission urgency, fuel/cargo weight, etc.) from the mission manager 808.

The flight controller 802 may provide feedback (e.g., vehicle state data, wind estimation data, etc.) to the vehicle dynamics lookup module 810 via the vehicle dynamics module 816, which may generate vehicle dynamic data from one or more sensors (e.g., 816b, 816c, 816d). Such vehicle dynamic data may also be used to control one or more flight controllers or flight controller systems (e.g., flight components 816a). Thus, the flight controller, coupled with the flight components 816a and one or more flight controllers/ systems and sensors, may function as the aircraft's flight control system.

The motion planner 804 may be configured to receive data (e.g., obstacle and state data) from the sensing and perception module 814, which may receive data measurements from various sensors positioned within one or both of the sensing and perception payload 508 and the optical payload 510. The various sensors may include, for example, light detection and ranging (LIDAR) 824, Radio Detection and Ranging (RADAR) 826, electro optical infrared (EO/IR) Imagers 828, a stereo vision camera system 838, radio altimeter (RADALT) 816b, air data sensor 816c, and/or GPS/inertial navigation system (INS) 816d. That is, certain of the various sensors may be positioned within the sensing and perception payload 508 to identify the selected touchdown zone 504, while certain other sensors (or redundant sensors) can be provided in the optical payload 510 to monitor the UGV 512. For example, one or more each of the sensing and perception payload 508 and the optical payload 510 may be provided with a LIDAR 824 and a stereo vision camera system 838.

The mission manager 808 may be communicatively coupled with one or more remotely situated systems or operators via a communications system or module 812. For example, the mission manager 808 may wirelessly communicate with a COP 110, MOB 112, FOB 114, HSI device 514, and/or another system 822, such as a medic, ground crew, other vehicles, etc. The mission manager 808 may be configured to send data reflecting the mission payload 830, countermeasures 832, and/or other data to a ground crew 834 (e.g., a HSI device 514, a cargo system, auxiliary system, etc.), or another system 836 (e.g., a medical system). Similarly, the mission manager 808 may be configured to receive data from sensors indicating a ground threat 820, or a casualty 818. Any processors and/or other hardware may be powered by a power supply, which may be alternating or direct current (e.g., traditional line current, battery power, solar power, wind power, etc.).

To facilitate the various functionalities of the of the package delivery system, the package delivery system may employ one or more processors operatively coupled to (1) a memory device, (2) one or more sensors, and/or (3) other systems disclosed herein or those known in the art. For example, to process and manipulate data, a processor may be equipped to run software that may be stored to ROM, RAM, or one or more other computer-readable storage mediums. Similarly, data collected or created by the package delivery system may be stored to RAM, ROM, or another suitable storage medium for longer-term retention. The package delivery system may receive and transmit, via said processor, data related to its location, speed, the UGV, etc. The flight controller 802 may further comprise a user interface (e.g., via a HSI device 514) allowing an operator (e.g., either human or computer-implemented, either of which may be local or remote) to input commands, control operation, and/or adjust settings of package delivery system. The user interface may be remotely coupled and/or may include, for example, a computer, a keyboard, mouse, touch screen, joystick, and the like.

Mission Manager 808.

The mission manager may comprise a (1) mission sequencer; (2) STANAG to robot operating system (ROS) bridge; (3) ROS to STANAG Bridge; (4) mission plan service; (5) route monitor; and (6) route feeder.

(1) Mission Sequencer.

The mission sequencer manages the overall behavior of the package delivery system, including the aircraft 102 and, where desired, the UGV 512. The mission sequencer can employ multiple state machines, one to manage the overall behavior of the aircraft and the others to manage the commands issued by the main operating base 112 and combat outpost 110, the HSI device 514, etc. The mission sequencer may track at which waypoint the aircraft 102 is positioned, instigate communications with the combat outpost 110 for landing negotiation, and instruct the route feeder to send a new route to the trajectory planner via the mission command, if needed. The mission sequencer may also communicate to the route feeder which route, or phase of the route, the aircraft 102 is performing (e.g., initialization and configuration 202, launch 204, en route, 206, approach 208, etc.).

(2) STANAG to ROS Bridge.

The STANAG to ROS Bridge acts as a bridge between the STANAG 4586 protocol used by the main operating base 112 and the aircraft's vehicle management system, the dynamic route planner (506) (which may or may not communicate using the STANAG-4586 protocol), the ROS protocol used by the mission manager, trajectory planner, perception system 814 and other components of the package delivery system. The STANAG to ROS bridge allows integration with the commonly-used STANAG 4586 messaging standard, increasing the portability of the package delivery system. The STANAG to ROS bridge can perform the following services: (1) aggregates a series of STANAG 4586 messages into a single mission plan ROS message and publishes this message over the ROS protocol. The mission plan data may comprise a set of routes (nominally: launch, flight, approach, contingency A, and contingency B), each possibly with their own set of waypoints. The mission plan data for each mission plan may have a source identifier, indicating if the plan came from the main operating base 112 or the dynamic route planner; (2) translates other STANAG 4586 messages into, for example, equivalent ROS messages and publishes those messages over the ROS protocol; and (3) subscribes to select ROS messages and translates them back into STANAG 4586 messages for broadcast on the STANAG 4586 multi-cast network, listened to by the Vehicle Specific Module (VSM) within the VMS, main operating base 112, possibly the dynamic route planner, and possibly the combat outpost 110. While the ROS protocol is disclosed and described herein, it is only one of multiple ways in which messages may be published within the package delivery system. Thus, one of ordinary skill in the art would recognize that other protocols, such as DDS, for example, are possible. Accordingly, the package delivery system should not be limited to use with the ROS protocol.

(3) ROS to STANAG Bridge.

The ROS to STANAG Bridge performs essentially the inverse function of the STANAG to ROS Bridge; it translates ROS data into STANAG messages and supports the outgoing interface between the package delivery system's internal components and the main operating base 112.

(4) Mission Plan Service.

The mission plan service subscribes to the mission plan ROS message, published by the STANAG to ROS node, and stores (in non-volatile memory) and organizes received mission plan data for use by elements of the mission manager, and possibly other ROS nodes. Whenever the mission plan service receives and processes new mission plan data, it may publish a configuration ROS message that specifies that the configuration is complete, and indicates key waypoint identifiers within the mission plan data, currently the rally, notification, and approach waypoint identifiers. The mission plan service will ensure that the waypoint identifiers are maintained in ascending numeric order corresponding to the visit order indicated by the route (e.g., if the route indicates the vehicle should visit Rome, Paris and London, in that order, Rome will have a lower numeric waypoint than Paris, which in turn will have a numerically lower waypoint identifier than London). Whenever the mission plan service receives a route data request from another ROS node, it may use the previous route and waypoint identifiers to fetch the corresponding series of waypoints and sends a route data reply with the requested number of waypoints back to the requestor. A request may request the current waypoint the vehicle is heading toward and all subsequent waypoints on the route.

(5) Route Monitor.

The route monitor subscribes to two sensor messages, one from the inertial state reported by the vehicle over STANAG 4586 (translated into a ROS message by the STANAG to ROS node), and the trajectory status message, provided by the trajectory planner using data from the perception system. The route monitor will select or merge information from these two sources and report progress along the route in single floating point value representing a fractional distance from the last past waypoint (e.g., 2.3 means~30% between waypoint 2 and the next waypoint along the route). This may be the same format as reported by the trajectory planner, although the information may not necessarily come solely from the trajectory planner. This can provide the option to generate this signal internally from a mixture of inputs. The route monitor also measures route deviations and will send a Boolean flag embedded along with the route progress within the route status to the mission sequencer.

(6) Route Feeder.

The route feeder block may create the mission command to the trajectory planner based on the current route provided by the mission sequencer, the current vehicle position, provided by the route monitor, and the set of route waypoints provided by the mission plan service. Upon receipt of a route selection from the mission sequencer and a vehicle position from the route monitor, the route feeder requests a set of waypoints (currently from the current vehicle position to the end of the route) from the mission plan service. The mission plan service replies with the requested set of waypoints. The route feeder may then form and publish the waypoints, in the form of a mission command. The trajectory planner may receive these waypoints and adjust its trajectory accordingly.

Dynamic Route Planner 806.

Route planning may be facilitated via a software algorithm called "4D-D*" that explicitly addresses the problem of routing multiple vehicles using a combination of data from maps as well as incrementally discovered information from the onboard sensors. This software is distinct in two specific ways. First, it explicitly considers a 4D space composed of x, y, z, and time, allowing explicit consideration of moving obstacles such as weather or other vehicles that must be avoided. Second, it uses concepts from a well-known route planning algorithm called Field-D* to optimally update trajectories as new information becomes available. This has an advantage that completely new trajectories can be calculated in milliseconds over a large map by modifying the old trajectories versus having to completely re-compute upon receiving new information. Depending on mission urgency or the priority given to saving fuel, different paths might be preferred. The algorithm will choose paths that optimize a large set of criteria, some of which might change during the mission. The algorithm complexity (compute time) may implement an "any time" version that will continually improve the solution given time but will produce an answer (in some cases, suboptimal) at any time it may be requested.

Motion Planner 804.

Given an initial path from the mission planner, the motion planner computes trajectories based on multiple objectives including proximity to obstacles, desired landing vector (based on wind direction), vehicle dynamics, and localization accuracy. The trajectory generation scheme also continuously improves and optimizes trajectories based on the criteria specified. It quickly produces and iterates on a new commanded path that avoids any detected obstacles and that the vehicle can follow. An advantage of this approach may be that the fidelity of the parallel planning algorithm scales with available computing power. If resources are limited, only a small part of the search space can be explored while still obtaining a "good-enough" solution. The planning system is robust and adaptive to the changing dynamics of a cargo aircraft 102 because they will change depending on the weight and wind conditions. The commands may be verified based on propagating the uncertainties of the different objectives and the execution uncertainty in a stochastic optimal control framework. This improves confidence in the execution of a plan and allows high-performance control of the vehicle. Special maneuvers relevant to launch from and landing on sloped terrain may also be employed. The algorithm may be configured to account for unexpected discontinuities in vehicle dynamics, e.g., contact with undetected ground features, through the addition of hidden states. Such mission-level and motion planning algorithms may be adapted to a wide range of aircraft. They combine multiple objectives and constraints in real time, incorporate and adapt the dynamics into the motion plan with higher fidelity control, and propagate uncertainties for robust control in sloped landing.

Flight Controller 802.

The flight controller 802 may be operatively coupled with the motion planner 804, the vehicle dynamics lookup module 810, and vehicle dynamics module 816. In operation, the flight controller 802 generates flight control signal data based at least in part on date received from, for example, motion planner 804, and one or more sensors (e.g., RADALT 816*b*, Air Data Sensor 816*c*, and/or GPS/INS device 816*d*). The flight control signal data generated by the flight controller 802 may be communicated to, or used to control, the flight components 816*a*. Example flight components 816*a* include, for example, rotorcraft flight controls (e.g., a collective, cyclic, pedals, throttle, auxiliary components, etc.) and fixed-wing aircraft controls (e.g., ailerons, rudder, trim tabs, elevators, throttle, etc.).

In one aspect, a flight controller 802 may further employ, for example, a user interface, and a processor operatively coupled to a memory/data storage and the one or more sensors. For example, to process and manipulate data, a processor may be equipped to run software which may be stored to ROM, RAM, or one or more other computer-readable storage mediums. Similarly, data collected or created by the flight controller 802 may be stored to RAM, ROM, or another suitable storage medium for longer-term retention. The flight controller 802 may receive and transmit, via said processor, data related to location, speed, attitude, etc. The flight controller 802 may further comprise a remotely situated user interface allowing an operator (e.g., either human- or computer-implemented, either of which may be local or remote) to input commands and/or control operation of flight controller 802. The remotely situated user interface may be the same remotely situated user interface used to control the package delivery system. The user interface may be coupled with the flight controller 802, and may include, for example, a computer, a keyboard, mouse, touch screen, joystick, and the like. To monitor the various flight conditions, the flight controller 802 may further employ one or more sensors (e.g., weather RADAR, engine sensors, vertical/directional gyroscopes, accelerometer, thermometer, altimeters, etc.).

Sensing and Perception 814.

An objective of the foregoing is to enable safe aircraft 102 operations during launch, cruise, and descent by making the aircraft 102 aware of its environment. Thus, an objective of the package delivery system may be to ensure a safe final approach and a stable touchdown, and environmental awareness during launch and/or cruise. For example, AACU perception may: (1) support cruise speeds of up to 250 knots; (2) permit a five-mile approach to a landing zone in two to four minutes; and (3) be configured to operate both in visually degraded and GPS-denied environments. To meet these objectives, a sensor package and perception algorithms are preferably tightly coupled. A sensor package's notable design features may be range (the greater the range of the sensors, the higher the approach speeds that can be supported), range resolution (the finer the resolution, the easier to detect roughness and slope of the terrain), and field of regard (FOR) (a large FOR may be needed to be able to image the landing zone all the way from a distant approach to a view point directly above the landing site). Operation in visually degraded environments will also require sensors that penetrate obscurants, and GPS-denied operation will require employment of available sensors to achieve alternate methods of navigation. Finally, for autonomous aircraft to be accepted by ground forces operating at the forward bases, the aircraft 102 may itself unambiguously identify common human gestures (such as a "wave-off") used by landing support specialists if present at the landing site. Analysis of various military aircraft missions shows that an aggressive low-flying profile such as those typically executed under hostile conditions may be the limiting case for determining the minimal sensor range for collision-free flight. This presumes that the final approach starts at 110 knots (a current example threshold), 600 meters from the landing site. At this speed it may be necessary to sense about 300 meters ahead, presuming that collisions are avoided by a combination of swerving and slowing down. The objective speed of 250 knots may be expected during cruise and may necessitate looking ahead by approximately 1 km. The final parameter, related to the determination of the exact location of the skids on touchdown may be to avoid objects of 15 cm (6") implying that the resolution and accuracy of ranging must be better than five cm. The sensor suite may conduct landing zone (LZ) validation by classifying the terrain around the designated touchdown zone based on shape (rough/smooth, flat/level), as well as by semantics (muddy/dry, vegetated/barren). During cruise flight and during final approach, the sensor suite may be used to find obstacles 506 such as buildings, trees, wires and towers that might not be known ahead of time. Third, the sensor suite may be used to estimate vehicle position in the case of GPS denial or outage that could occur due to jamming or due to blockage by terrain. A point of departure design includes redundant, complementary sensors.

Scanning LIDAR 824.

LIDAR, also called a laser scanner, refers to a technology capable of measuring distance by illuminating a target with a laser and analyzing the reflected light. Thus, a two-axis scanning LIDAR may be used to provide high-resolution imaging starting at 400 meters so as to enable "straight-in landings" at speeds up to, for example, 135 knots. With a very large field of regard (180°), a scanning LIDAR may be used as a primary sensor for environmental perception, whereby the laser ranging is capable penetrates all but heavy obscurants. The same LIDAR may be used for gesture recognition of personnel indicating final approval to land or a wave-off. Small LIDARs, positioned appropriately, may also be used to determine if the aircraft 102 is sinking in vegetation or soft terrain, and to avoid tail strikes during launches involving pedal turns.

RADAR 826.

RADAR, such as forward-looking RADAR, may be used to provide low-resolution imaging through weather conditions and thick brownout conditions during landing. The forward-looking RADAR may be configured to measure distance to objects, such as transmission towers, tree lines, and other vehicles, at distances of up to 2 km. In addition, this modality can be used to perform "cruise-missile"-like navigation in GPS-denied environments.

EO/IR Imagers 828.

Passive Electro Optical Infrared (EO/IR) Imagers may be generally used for navigation in GPS-denied environments, for terrain analysis and detection of water and vegetation.

Stereo Vision 838.

The stereo vision camera system 838 may employ two cameras, displaced horizontally from one another, to obtain two differing views on of the area (e.g., the area within the aircraft field of view 516). By comparing these two images, the relative depth information can be obtained in the form of a disparity map, which encodes the difference in horizontal coordinates of corresponding image points. The values in this disparity map are inversely proportional to the scene depth at the corresponding pixel location.

Communication 812.

The package delivery system architecture 800 may be operatively coupled with one or more communication transceivers, which may be used to wirelessly communicate data signals between the aircraft 102 and a remote system, such as a COP 110, MOB 112, FOB 114, HSI device 514, and/or another system 822. For example, a wireless communication device may be configured to communicate data (e.g., surveillance data, mission plan data, flight control signal data, UGV navigational commands, etc.) with the one or more remote systems. To facilitate optional wireless communication, the aircraft 102 may further comprise an air communication link enabled to transmit ("TX") and receive ("RX") data using one or more antennas (e.g., top and bottom). The antenna may be controlled via a processor that is operatively coupled to an RF switch. Thus, data collected or created by the package delivery system's architecture 800 may be communicated with a remote system and/or any other device capable of wired or wireless communication using either a wired communication link or a wireless communication link.

Lost Communications.

The package delivery system may provide, for example, three or more communications links between, for example: (1) MOB 112 and aircraft 102, (2) COP 110 and aircraft 102, (3) FOB 114 and aircraft 102, (4) UGV 512 and aircraft 102, (5) HSI device 514 and aircraft 102, and (6) between one or more of the MOB 112, COP 110, FOB 114, UGV 512, and/or HSI device 514. Communications may be maintained by establishing any two communications links. For example, an aircraft 102 equipped with a package delivery system may execute a lost communications contingency if communications are lost with both the main operating base 112 and the combat outpost 110. If communications with either are present, the package delivery system-equipped aircraft 102 may continue its mission, except for situations where specific communications are required (e.g., requiring landing confirmation from the combat outpost 110). In such cases, the package delivery system-equipped aircraft behavior may be explicitly specified for that scenario. Lost communications with the main operating base 112 may be defined according to the STANAG standard. Lost communications with the combat outpost 110 may be defined as the lack of a heartbeat message for a predetermined time (e.g., 10 to 300 seconds, more preferably 20 seconds to 100 seconds, most preferably about 30 seconds). If communication is re-established after a lost communications contingency has been executed, the operator may override the package delivery system-equipped aircraft's behavior by uploading and executing new mission plan data. This may include commanding the aircraft 102 to execute its currently loaded mission. The main operating base 112 has the capability of uploading new mission plan data, whereas the combat outpost 110 does not. Therefore, the only function a combat outpost 110 can execute is to command the package delivery system-equipped aircraft 102 to re-establish its mission to land at the previously-designated touchdown zone (or alternate thereto).

GPS/INS 816d.

When available, a GPS/INS device 816d may be used to provide latitude and longitude information, as well as altitude. GPS/INS device 816d uses GPS satellite signals to correct or calibrate a solution from an INS. The GPS gives an absolute drift-free position value that can be used to reset the INS solution, or can be blended with the INS by use of a mathematical algorithm, such as a Kalman Filter. The angular orientation of the unit can be inferred from the series of position updates from the GPS. The change in the error in position relative to the GPS can be used to estimate the unknown angle error. The benefits of using GPS with an INS are that the INS may be calibrated by the GPS signals and that the INS can provide position and angle updates at a quicker rate than GPS. For high dynamic vehicles, such as missiles and aircraft, INS fills in the gaps between GPS positions. Additionally, GPS may lose its signal and the INS can continue to compute the position and angle during the period of lost GPS signal.

When the GPS/INS device 816d is unavailable (e.g., a GPS-Denied Operation), which may be due to poor reception or a malfunction, the package delivery system's architecture 800 remains functional where GPS signals are interrupted; for example, due to active jamming or shadowing from terrain. Generally speaking, the package delivery system may navigate the aircraft 102 using visual landmarks for navigation during descent. Specifically, satellite maps of the area along with Digital Terrain Evaluation Data (DTED) may be used to determine salient features offline. Thus, one or more databases, which may be stored to a memory/data storage device, may be used to store information related to, without limitation, DTED, buildings and structures, geographical maps, military maps, and/or any other information that may be used to assist in navigating the aircraft. During a mission, features from an onboard camera are compared to the maps to produce a navigation solution. Typically, accuracy may be 1% of distance traveled for such applications. In the case that salient features are continuously available during the mission, drift in navigation can be significantly reduced. Flight tests show that navigation error can be capped to 10 meters (3 sigma) in an hour of flight over varying terrain.

Obscurant Penetration and Obstacle Detection During En Route Cruise.

Visually degraded environments are common in combat operations and can complicate the process of autonomous low-elevation flight. Ensuring collision-free flight when flying close to and inside clouds or during the final approach where the landing zone may be obscured by brownout may require special consideration. An approach to this may be two-fold. First the LIDAR may be capable of ranging in light through moderate obscurants using a method called full waveform analysis. In contrast to most laser-ranging devices that use the first return over threshold to compute range, this method looks at all returns from a laser "chirp" to determine the furthest opaque object. Intermediate returns can automatically be flagged in the sensor hardware. Since laser ranging cannot penetrate the thickest obscurants and because high cruise speeds may require km-scale ranging, a RADAR (e.g., W-Band (94 GHz)) may be included for operating the aircraft 102 in a brownout environment. At cruise speeds, the RADAR look-ahead distance for objects such as transmission towers and ridgelines may be increased (relevant in case of navigation failure). During final approach, the RADAR can provide returns corresponding to ground objects such as vehicles, buildings and power lines. RADAR returns from a ALG W-band (94 Ghz) RADAR mounted to the front of an aircraft 102 descending into a landing zone may be mapped onto a pilot's display during an approach to a landing zone.

Gesture Recognition for Communication with Landing Support Specialists.

The LIDAR for landing zone validation can be used to detect gestures by field personnel. Simple gestures can be detected by the LIDAR used to perform landing zone validation and to generate a range image. Such imagery is robust to ambient illumination or requiring the personnel to use any fixed infrastructure to signal to the aircraft. Hand and/or body gestures already in use by marine landing support specialists and army pathfinders can likely be used to provide final confirmation to land or to wave-off the landing.

The perception system offers at least three advantages, including: (1) Combining scanning LIDAR and RADAR provides both long-range detection in degraded visual environments ("DVE") and high resolution for determining an optimal landing zone; (2) position estimation that can be based on EO/IR Imagers/LIDAR/RADAR as necessary (only EO/IR Imagers might be used for stealth) to provide robustness (e.g., to GPS outage) and high performance; and (3) Terrain Analysis based on both geometry (from LIDAR) and vegetation properties (EO/IR Imagers). The main sensor (scanning LIDAR) is a derivative of a commonly used device for aerial survey and offers significantly higher accuracy, larger adaptable field of view, and lower price than other sensors such as Flash LIDAR. The RADAR sensor may be configured to penetrate weather and brownout conditions to provide assurance of collision-free flight.

Internal Interfaces.

The Configuration sent from the mission plan service to the mission sequencer indicates whether or not the configuration is complete, and contains the indices of specific action waypoints: (1) rally waypoint 218—last waypoint of launch route—used to change from launch to flight route; (2) notification waypoint 222—point at which package delivery system requests permission to land from the combat outpost 110; and (3) approach waypoint—last waypoint of flight route and first waypoint of approach route. The configuration also contains status regarding an updated mission and threshold for route deviation, beyond which a route re-plan may be necessary.

Route Data Request.

A Route Data Request is one half of a synchronous ROS service call to the mission plan service to request a set of waypoints along a given route. The request contains the route identifier, the starting waypoint identifier to fetch from, and the number of consecutive waypoints to fetch or a flag valve to fetch all remaining waypoints in the route. Upon receipt of this request, the mission plan service will reply with an array of waypoints.

Waypoints.

This ROS message is the response to a route data request. It comprises an array of waypoints, starting from the waypoint identifier indicated in the request and containing the number of waypoints requested. If the request indicates all remaining waypoints, this response will contain all remaining waypoints along the route.

Route Status.

The route status message indicates the current location of the vehicle relative to the route's waypoints and a Boolean flag indicating if the vehicle has veered too far off the planned route. The vehicle's waypoint location may be expressed as a floating-point waypoint identifier, where the integer portion indicates the most recent waypoint passed, and the fractional portion indicates the fractional distance between the passed waypoint and the next waypoint the vehicle is flying toward (this may be an identical representation to the Trajectory Status). The Boolean flag indicates if the vehicle flight path has diverged past some limit from the planned path and may trigger a re-plan, if so determined by the Mission Sequencer.

Human-System Interface (HSI).

An objective is to generally have an autonomous aircraft fit into the cargo delivery and casualty evacuation process as seamlessly as possible. Advantages of the package delivery system stem not only from technical achievement, but also from its procedures being easily adopted by personnel interacting with the vehicle at various stages of the mission with no specialized training. Landing at unprepared sites historically required specific attention since units operating in remote locations are severely resource-constrained. Interaction with the vehicle must be achievable with minimal equipment and infrastructure. Hence, field personnel may be able to request services from an aircraft equipped with a package delivery system for cargo resupply and CASEVAC. This interface must be intuitive and oriented around the tasks done during cargo and casualty evacuation using an intuitive interface. In some cases, it may be essential that the vehicle not depend on an operator to land since it might be directed to a location with no ground personnel or communication. Hence the most useful role of the operator during the critical landing phase may be to enhance safety, allowing the complete human-machine system to perform at a higher level of capability than the machine or a human pilot on his or her own. Human-system interaction will also enable a level of redundancy in case the onboard systems fail or their performance may be degraded.

Interface technologies may be tailored according to how useful they are to the MOB 112, FOB 114, and COP 110 operators. For example, at the MOB 112, this might lead to networked PCs with smart boards. At the slightly more austere FOB 114, the UGCS-400 interface with touch screens for simple negotiation offers potential. At the very austere COP 110, size, weight, and power are particularly constraining, and we will consider cell phone applications and functionality. More sophisticated functionality, such as multi-vehicle tasking at the FOB 114 or complex negotiations with both the FOB and vehicle at the COP 110 may be possible.

Modular and Open System Architecture.

The package delivery system may be provided with modular, platform-agnostic processors, sensor suites, and software that can be adapted to various aircraft and missions, thus lowering total ownership costs and the time needed to integrate developed technology into fielded systems. Current solutions for complex architectures rely on a series of point-to-point devices, each with specialized interfaces. To lower the number of components in these systems, many functions are usually combined within one device using tightly coupled code developed for specific hardware, operating systems, applications, and target platforms. Traditional architectures require significant time and capital resources to integrate, certify, and upgrade while limiting life-cycle maintenance to one prime integrator. a package delivery system, however, would benefit from an improved architecture that allows functional modules to be interoperable with clearly defined interfaces. In addition, the architecture will need to support health monitoring, diagnostics, and restarting of failed computer processes during the mission, all without the involvement of an onboard crew.

The package delivery system functional architecture may be integrated within a robust open architecture framework to provide platform-agnostic automation for rapid resupply and CASEVAC. To open the development ecosystem, an open architecture and/or Global Open Architecture Layer (GOAL) may be employed to exploit concepts of module partitioning, hardware and software abstraction, loose coupling of functional modules, and a central standardized data exchange layer. The GOAL, for example, may be implemented as a Service-Oriented Architecture (SOA) that exchanges data through a shared canonical data model using the Data Distribution Service (DDS) international standard. Platform/mission-specific modules are easily replaced in such architectures. DDS may be an anonymous publication/subscription middleware standard that provides a low overhead and low latency solution targeted for real-time processing and embedded applications. DDS allows for extensive control of quality of service attributes that ensure reliability, bandwidth, delivery deadlines, resource limits, priorities, security, and information assurance. Combined with hardware and operating system abstraction, this architecture facilitates component re-use, services 'plug and play', open competition for development and integration, platform-agnostic functionality, and interoperability between system components and other systems. The architecture also allows other advances like system health monitoring and sense and avoid to be easily integrated into the overall package delivery system-equipped aircraft. GOAL enables universal AACU services to control 'plug and play' platforms, sensors, and equipment via a government controlled interface standards.

Figure 9:
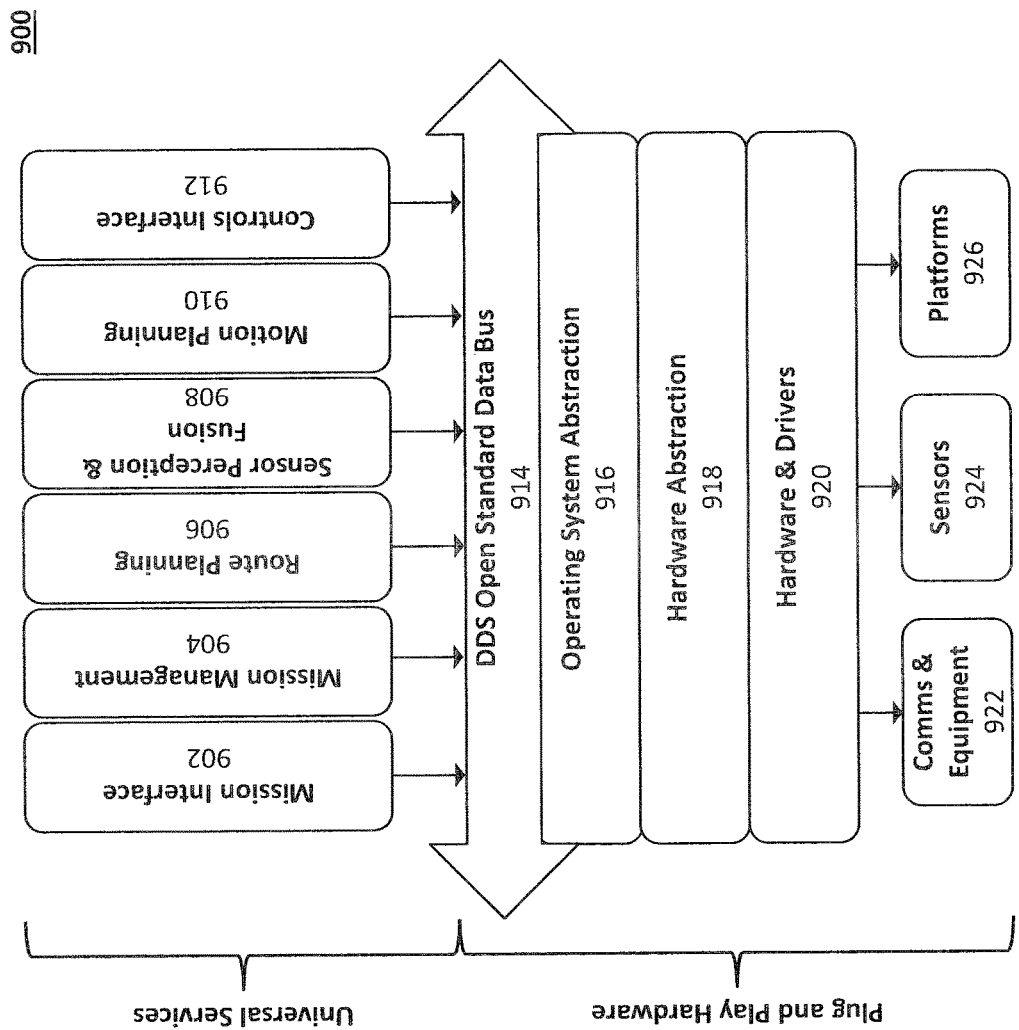
FIG. 9 shows a high-level view of a proposed system architecture as composed of functional modules.

FIG. 9 illustrates a high-level view of the proposed architecture as composed of functional modules, each of which enforces a well-defined interface. The top layer may include a number of universal services, such as mission interface 902, mission management 904, route planning 906, sensor perception and fusion 908, motion planning 910, and controls interface 912. One or more of the universal services may be communicatively coupled with DDS open standard data bus 914. Operatively coupled to the DDS open standard data bus 914 are one or more plug and play hardware component layers. For example, operating system abstraction 916 may be provided and designed to abstract the operating environment to at least one targeted operating system. The operating system abstraction 916 may implement the operating system application programming interface (API) for a particular underlying operating system and hardware platform. Thus, the abstraction layer provides a direct implementation for functionality that an underlying operating system may not support. Example abstraction layers may include, for example, a hardware abstraction layer 918, a hardware and drivers abstraction layer 920, which may operative couple hardware such as communication and equipment 922, sensors 924, and platforms 926

System Architecture.

The package delivery system may be composed of a set of top-level subsystems. These are: ground units (e.g., forward operating base 114, main operating base 112 and combat outpost 110) and airborne units (e.g., VMS/VSM, mission manager, trajectory planner, perception system, and flight control system). The main operating base 112 and the combat outpost 110 are the ground control units, the main operating base 112 being a full-blown ground control system and the combat outpost 110 being a small, hand-held device for use in the field. The airborne units comprise the majority of the package delivery system, with the exception of the VMS and flight control system, which are part of the aircraft.

Mission Manager Architecture.

The mission manager is generally responsible for coordinating the major autonomous operations of the vehicle, including: (a) sequencing the major autonomous operations of the vehicle, such as notifications to the command outpost, receipt and processing of wave-off and aborts, etc.; (b) monitoring and feeding desired location information (waypoints) to a trajectory planner; (c) requesting the automatic recalculation of the flight route upon significant deviations from the desired flight route or upon changes in the mission's area of operation (safe air volume); (d) the portability and openness of the disclosure may be ensured through: (i) open communications standard (e.g., user datagram protocol (UDP)); and (ii) separation of logic from the messaging format in order to facilitate future migration to a global open architecture; (e) ease-of-use may be: (i) ensured through support of IP-based radio communications with the package delivery system-equipped aircraft; (ii) developed using human-machine interface (HMI) methods available though in modern mobile device applications such as Apple's iOS or Google's Android; and (iii) controlled from a mobile, man-packable device that capitalizes on modern communications technology.

While the present disclosure has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions. All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A package delivery system for use with an aircraft, the package delivery system comprising:
a land vehicle equipped with a first processor operatively coupled with a first sensor package and a first communication transceiver, the first processor configured to navigate the land vehicle along a navigational land route based at least in part on data received via the first communication transceiver;
a perception system having a second sensor package operatively coupled with a second processor and a second communication transceiver; and
a human-system interface (HSI) device to communicate with the land vehicle and the perception system over one or more wireless links, wherein the HSI device, which is separate and apart from each of the land vehicle and the perception system, includes a third processor, a third communication transceiver, a user input device, and a display device,
wherein the perception system is configured to transmit navigational commands to said land vehicle via said first communication transceiver based at least in part on data from the second sensor package, and
wherein the HSI device is configured to transmit navigational commands to said land vehicle via said third communication transceiver and to receive from the land vehicle a video feed captured by the first sensor package.

2. The package delivery system of claim 1, wherein the second sensor package includes a first optical payload and a second optical payload, wherein each of said first optical payload and said second optical payload is configured to be positioned at different locations of the aircraft.

3. The package delivery system of claim 2, wherein said first optical payload is configured to generate terrain data for a geographic area prior to landing at a touchdown zone within the geographic area, wherein the second processor is configured to determine the navigational land route from the touchdown zone to a field operator based at least in part on the terrain data.

4. The package delivery system of claim 3, wherein said second optical payload is configured to track the land vehicle from the touchdown zone as the land vehicle travels along the navigational land route.

5. The package delivery system of claim 4, wherein each of said first optical payload and said second optical payload include LIDAR or a stereo vision camera system.

6. The package delivery system of claim 3, wherein the second processor is configured to determine a plurality of navigational land routes from the touchdown zone to the field operator based at least in part on the terrain data.

7. The package delivery system of claim 6, wherein the HSI device is configured to present to the field operator, via the display device, the plurality of navigational land routes for selection by the field operator through the user input device.

8. The package delivery system of claim 1, wherein the perception system is configured to, in real time, (1) detect obstacles along the navigational land route, and (2) transmit navigational commands dynamically to autonomously navigate the land vehicle while it travels along the navigational land route.

9. The package delivery system of claim 1, wherein the HSI device is configured to display the video feed on the display device.

10. The package delivery system of claim 1, wherein the HSI device is configured to receive from the perception system a second video feed captured by the second sensor package and the HSI device is configured to display the second video feed on the display device.

11. The package delivery system of claim 1, wherein navigational commands from the HSI device are prioritized over navigational commands from the perception system.

12. The package delivery system of claim 1, wherein the HSI device is configured to display a land vehicle route screen via the display device.

13. The package delivery system of claim 2, wherein the aircraft is a vertical take-off and landing aircraft.

14. The package delivery system of claim 3, wherein the aircraft is configured to transport the land vehicle from a remote location to the touchdown zone.

15. A human-system interface (HSI) device to facilitate bidirectional communication with a land vehicle and a perception system mounted to an aircraft at a touchdown zone that is configured to track the land vehicle as it travels along a navigational land route between the touchdown zone and a field operator, the HSI device comprising:
a processor;
a display device;
a user input device operatively coupled with the processor; and
a communication transceiver operatively coupled with the processor to communicate with the land vehicle and the perception system over one or more wireless links,
wherein the HSI device, which is separate and apart from each of the land vehicle and the aircraft, is configured to (1) transmit navigational commands to said land vehicle via said communication transceiver, (2) receive from the land vehicle a video feed captured by a first sensor package positioned on said land vehicle via said communication transceiver, and (3) receive from the perception system location data reflecting the land vehicle's position along the navigational land route, wherein the location data is generated by a second sensor package of the perception system that is positioned on the aircraft.

16. The HSI device of claim 15, wherein the display device is configured to display a plurality of navigational land routes for selection by the field operator through the user input device.

17. The HSI device of claim 15, wherein the display device is configured to display the video feed.

18. The HSI device of claim 15, wherein the HSI device is configured to receive from the perception system a second video feed captured by the second sensor package.

19. The HSI device of claim 15, wherein said user input device is a touch screen and the display device is configured to simultaneously display the video feed and one or more navigational controller icons.

20. An unmanned ground vehicle (UGV) for use in an aerial package delivery system, the UGV comprising:
a chassis to support a package;
an optical payload to generate a video feed of a geographic area;
a communication transceiver to facilitate bidirectional communication with a human-system interface (HSI) device and a perception system over one or more wireless links, wherein the perception system is coupled to an aircraft at a touchdown zone within the geographic area; and
a processor operatively coupled with each of the communication transceiver and the optical payload, wherein the processor is configured to navigate the UGV along a navigational land route from the touchdown zone to a field operator based on navigational commands received from the HSI device or the aircraft via the communication transceiver, and to transmit the video feed to the HSI device.

21. The UGV of claim 20, wherein the navigational land route is received from the perception system via the communication transceiver.

22. The UGV of claim 20, wherein the perception system is configured to track the UGV from the touchdown zone as the UGV travels along the navigational land route.

23. The UGV of claim 20, wherein the communication transceiver is configured to receive navigational commands from the aircraft and the HSI device in real-time to autonomously navigate the UGV along the navigational land route.

24. The UGV of claim 20, wherein the processor is configured to localize the UGV based on its location relative to the aircraft.

* * * * *